(12) United States Patent
Kieckhafer et al.

(10) Patent No.: US 11,380,984 B2
(45) Date of Patent: Jul. 5, 2022

(54) RADOME DESIGN

(71) Applicant: SAINT-GOBAIN PERFORMANCE PLASTICS CORPORATION, Solon, OH (US)

(72) Inventors: Alexander Kieckhafer, Lakewood, OH (US); Eric R. Oswald, Hudson, OH (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 17/121,936

(22) Filed: Dec. 15, 2020

(65) Prior Publication Data

US 2021/0203068 A1 Jul. 1, 2021

Related U.S. Application Data

(60) Provisional application No. 62/972,698, filed on Feb. 11, 2020, provisional application No. 62/955,072, filed on Dec. 30, 2019.

(51) Int. Cl.
*H01Q 1/42* (2006.01)

(52) U.S. Cl.
CPC .............. *H01Q 1/422* (2013.01); *H01Q 1/421* (2013.01); *H01Q 1/428* (2013.01)

(58) Field of Classification Search
CPC ......... H01Q 1/422; H01Q 1/421; H01Q 1/428
See application file for complete search history.

(56) References Cited

U.S. PATENT DOCUMENTS

| 6,028,565 | A | 2/2000 | Mackenzie et al. |
| 6,399,903 | B1 | 6/2002 | Stevenson |
| 6,627,296 | B1 * | 9/2003 | Tudela ..................... B32B 3/12 |
| | | | 428/182 |
| 7,420,523 | B1 * | 9/2008 | Ziolkowski ............ H01Q 1/422 |
| | | | 343/872 |
| 7,463,212 | B1 * | 12/2008 | Ziolkowski .............. H01Q 1/42 |
| | | | 343/872 |

(Continued)

FOREIGN PATENT DOCUMENTS

| EP | 2747202 A1 | 6/2014 |
| JP | H06-196915 A | 7/1994 |

(Continued)

OTHER PUBLICATIONS

International Search Report and Written Opinion for PCT Application No. PCT/US2020/065010, dated Apr. 13, 2021, 10 pages.

*Primary Examiner* — Lam T Mai
(74) *Attorney, Agent, or Firm* — Abel Schillinger, LLP; Adrian Lawrence

(57) ABSTRACT

A radome structure may include a structural component, an inner tuning layer component underlying the structural component and an outer tuning layer component overlaying the structural component. The structural component may include a first fiber-reinforced dielectric layer that may include a first fiber-reinforced polymer. The inner tuning layer component may include a first inner tuning layer that may include a second fiber-reinforced polymer. The outer tuning layer component may include a first outer tuning layer that may include a third fiber-reinforced polymer.

18 Claims, 5 Drawing Sheets

(56) References Cited

U.S. PATENT DOCUMENTS

| | | |
|---|---|---|
| 8,917,220 B2 | 12/2014 | Ziolkowski et al. |
| 2006/0044189 A1* | 3/2006 | Livingston ............ H01Q 9/0414 |
| | | 343/700 MS |
| 2008/0316140 A1* | 12/2008 | Wu .................... H01Q 15/0053 |
| | | 343/872 |
| 2010/0225563 A1* | 9/2010 | Lin ........................ H01Q 15/24 |
| | | 343/909 |
| 2013/0002514 A1* | 1/2013 | Ziolkowski ............ H01Q 1/286 |
| | | 343/872 |
| 2013/0321236 A1* | 12/2013 | Ziolkowski ............ H01Q 1/424 |
| | | 343/872 |
| 2017/0309996 A1* | 10/2017 | Seghi ........................ H01Q 1/42 |
| 2020/0212556 A1* | 7/2020 | Moore .................. B32B 27/304 |
| 2020/0212557 A1* | 7/2020 | Descloux ............... H01Q 1/421 |
| 2021/0384621 A1* | 12/2021 | Johansson .............. H01Q 1/246 |

FOREIGN PATENT DOCUMENTS

| | | |
|---|---|---|
| JP | H08-148922 A | 6/1996 |
| JP | 2009-028900 A | 2/2009 |
| JP | 2011-211521 A | 10/2011 |
| JP | 4957681 B2 | 6/2012 |
| WO | 9212550 A1 | 7/1992 |

* cited by examiner

RADOME DESIGN

CROSS-REFERENCE TO RELATED APPLICATION(S)

This application claims priority under 35 U.S.C. § 119(e) to U.S. Provisional Patent Application No. 62/955,072, entitled "RADOME DESIGN," by Alexander KIECKHAFER et al., filed Dec. 30, 2019, and claims priority under 35 U.S.C. § 119(e) to U.S. Provisional Patent Application No. 62/972,698, entitled "RADOME DESIGN," by Alexander KIECKHAFER et al., filed Feb. 11, 2020, which applications are assigned to the current assignee hereof and are incorporated by reference herein in their entireties.

FIELD OF THE DISCLOSURE

The present disclosure relates to radome structural designs and, in particular, to radome structural designs optimized for transmission of broadband electromagnetic waves.

BACKGROUND

Generally, microwave antennas are covered with radomes to protect the antennas from harmful weather conditions and to ensure the antenna's continuous and precise operation. Radomes can be in the form of thin wall radomes, solid wall radomes, and sandwich radomes. Thin wall radomes have a thickness typically less than 1/16 inch and may be supported using increased air pressure or using a supporting frame. Solid wall radomes are typically made of a heavier solid laminate, and sandwich radomes include a low dielectric core material sandwiched between thin inner and outer laminate layers. The core material is typically a plastic foam structure or a honeycomb structure.

Regardless of the materials used to form radomes, the radome structure generally degrades the signal strength of electromagnetic waves transmitted from the antennas through the radome. This is particularly true in regards to broadband transmissions. Accordingly, radomes with improved structural designs that have the ability for adjustment and optimization to minimize electromagnetic degradation over broadband electromagnetic wave transmissions are desired.

SUMMARY

According to a first aspect, a radome structure may include a structural component, an inner tuning layer component underlying the structural component and an outer tuning layer component overlaying the structural component. The structural component may include a first fiber-reinforced dielectric layer that may include a first fiber-reinforced polymer. The inner tuning layer component may include a first inner tuning layer that may include a second fiber-reinforced polymer. The outer tuning layer component may include a first outer tuning layer that may include a third fiber-reinforced polymer.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a radome structure that may include a structural component, an inner tuning layer component underlying the structural component and an outer tuning layer component overlaying the structural component. The combination of the laminate component and the inner tuning layer component is designed to optimize co-polarization and cross-polarization over a broadband spectrum (i.e., a frequency range of from about 10 GHz to about 31 GHz).

Figure 1A:
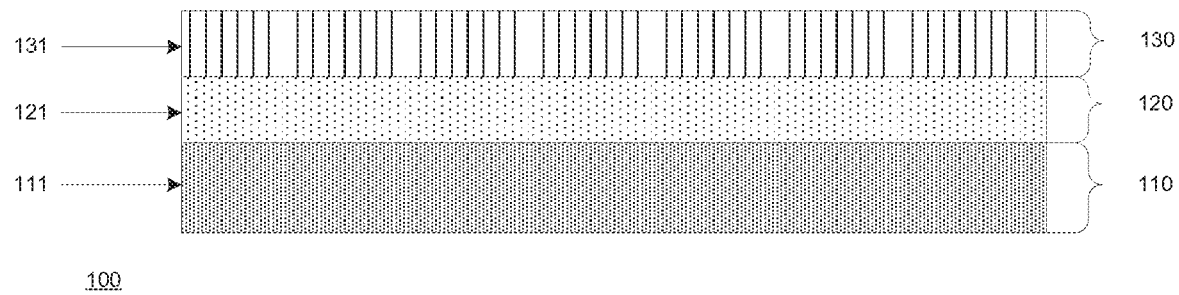
FIGS. 1a & 1b include illustrations of a radome structure according to embodiments described herein.

For purposes of illustration, FIG. 1a includes an illustration of a radome structure 100 according to embodiments described herein. As shown in FIG. 1a, a radome structure 100 may include a structural component 120, an inner tuning layer component 110 underlying the structural component 120, and an outer tuning layer component 130 overlying the structural component 120. According to certain embodiments, and as also shown in FIG. 1a, the structural component 120 may include a first fiber-reinforced dielectric layer 121 that may include a first fiber-reinforced polymer. According to still other embodiments, and as further shown in FIG. 1a, the inner tuning layer component 110 may include a first inner tuning layer 111 that may include a second fiber-reinforced polymer. According to yet other embodiments, and as further shown in FIG. 1a, the outer tuning layer component 130 may include a first outer tuning layer 131 that may include a third fiber-reinforced polymer.

Referring first to the structural component 120, according to certain embodiments, the structural component 120 may have a particular thickness. For example, the structural component 120 may have a thickness of at least about 0.1 mm, such as, at least about 0.2 mm or at least about 0.3 mm or at least about 0.4 mm or at least about 0.5 mm or at least about 0.6 mm or at least about 0.7 mm or at least about 0.8 mm or at least about 0.9 mm or at least about 1.0 mm. According to yet other embodiments, the structural component 120 may have a thickness of not greater than about 15 mm, such as, not greater than about 14.5 mm or not greater than about 14.0 mm or not greater than about 13.5 mm or not greater than about 13.0 mm or not greater than about 12.5 mm or not greater than about 12.0 mm or not greater than about 11.5 mm or not greater than about 11.0 mm or not greater than about 10.5 mm or not greater than about 10.0 mm or not greater than about 9.5 mm or not greater than about 9.0 mm or not greater than about 8.5 mm or not greater than about 8.0 mm or not greater than about 7.5 mm or not greater than about 7.0 mm or not greater than about 6.5 mm or not greater than about 6.0 mm or not greater than about 5.5 mm or even not greater than about 5.0 mm. It will be appreciated that the thickness of the structural component 120 may be within a range between any of the minimum and maximum values noted above. It will be further appreciated that the thickness of the structural component 120 may be any value between any of the minimum and maximum values noted above.

Referring first to the first fiber-reinforced dielectric layer 121 of the structural component 120, according to certain embodiments, the first fiber-reinforced polymer of the first fiber-reinforced dielectric layer 121 may include a first polymer component and a first fiber component.

According to certain embodiments, the first polymer component of the first fiber-reinforced polymer may include an epoxy. According to still other embodiments, the first polymer component of the first fiber-reinforced polymer may include a cyanate ester resin. According to yet other embodiments, the first polymer component of the first fiber-reinforced polymer may include a combination of an epoxy and a cyanate ester resin. According to yet other embodiments, the first polymer component of the first fiber-reinforced polymer may consist essentially of an epoxy. According to still other embodiments, the first polymer component of the first fiber-reinforced polymer may consist essentially of a cyanate ester resin. According to yet other embodiments, the first polymer component of the first fiber-reinforced polymer may consist essentially of a combination of an epoxy and a cyanate ester resin.

According to yet other embodiments, the first fiber component of the first fiber-reinforced polymer may include a low-dielectric constant quartz fabric, a high-modulus polypropylene (HMPP) fabric, an electrical-grade glass (E-glass) fabric, a structural-grade glass (S-glass) fabric, a basalt fabric, or a unidirectional ribbons of a low-dielectric constant quartz fabric, a unidirectional ribbons of an electrical-grade glass (E-glass) fabric, a unidirectional ribbons of a structural-grade glass (S-glass) fabric, a unidirectional ribbons of a basalt fabric, combinations thereof, or and multi-material hybrid weaves thereof. According to yet other embodiments, the first fiber component of the second fiber-reinforced polymer may consist essentially of a low-dielectric constant quartz fabric, a high-modulus polypropylene (HMPP) fabric, an electrical-grade glass (E-glass) fabric, a structural-grade glass (S-glass) fabric, a basalt fabric, or a unidirectional ribbons of a low-dielectric constant quartz fabric, a unidirectional ribbons of an electrical-grade glass (E-glass) fabric, a unidirectional ribbons of a structural-grade glass (S-glass) fabric, a unidirectional ribbons of a basalt fabric, combinations thereof, or and multi-material hybrid weaves thereof.

According to yet other embodiments, the first fiber-reinforced dielectric layer 121 of the first structural layer component 120 may have a particular thickness. For example, first fiber-reinforced dielectric layer 121 may have a thickness of at least about 0.1 mm, such as, at least about 0.2 mm or at least about 0.3 mm or at least about 0.4 mm or at least about 0.5 mm or at least about 0.6 mm or at least about 0.7 mm or at least about 0.8 mm or at least about 0.9 mm or at least about 1.0 mm. According to yet other embodiments, the first fiber-reinforced dielectric layer 121 may have a thickness of not greater than about 5.0 mm, such as, not greater than about 4.5 mm or not greater than about 4.0 mm or not greater than about 3.5 mm or not greater than about 3.0 mm or even not greater than about 2.5 mm. It will be appreciated that the thickness of the first fiber-reinforced dielectric layer 121 may be within a range between any of the minimum and maximum values noted above. It will be further appreciated that the thickness of the first fiber-reinforced dielectric layer 121 may be any value between any of the minimum and maximum values noted above.

Referring now to the first inner tuning layer 111 of the outer tuning layer component 110, according to certain embodiments, the second fiber-reinforced polymer of the first inner tuning layer 111 may include a second polymer component and a second fiber component.

According to certain embodiments, the second polymer component of the second fiber-reinforced polymer may include an epoxy. According to still other embodiments, the second polymer component of the second fiber-reinforced polymer may include a cyanate ester resin. According to yet other embodiments, the second polymer component of the second fiber-reinforced polymer may include a combination of an epoxy and a cyanate ester resin. According to yet other embodiments, the second polymer component of the second fiber-reinforced polymer may consist essentially of an epoxy. According to still other embodiments, the second polymer component of the second fiber-reinforced polymer may consist essentially of a cyanate ester resin. According to yet other embodiments, the second polymer component of the second fiber-reinforced polymer may consist essentially of a combination of an epoxy and a cyanate ester resin.

According to yet other embodiments, the second fiber component of the second fiber-reinforced polymer may include a high-modulus polypropylene (HMPP) fabric, a unidirectional ribbon of HMPP, a hybrid weave of HMPP with at least one of E-glass, S-glass, basalt, or quartz fibers, or combinations thereof. According to yet other embodiments, the second fiber component of the second fiber-reinforced polymer may consist essentially of a high-modulus polypropylene (HMPP) fabric, a unidirectional ribbon of HMPP, a hybrid weave of HMPP with at least one of E-glass, S-glass, basalt, or quartz fibers, or combinations thereof.

According to still other embodiments, the inner tuning layer component 110 may have a particular thickness. For example, the inner tuning layer component 110 may have a thickness of at least about 0.5 mm, such as, at least about 0.6 mm or at least about 0.7 mm or at least about 0.8 mm or at least about 0.9 mm or at least about 1.0 mm or at least about 1.1 mm or at least about 1.2 mm or at least about 1.3 mm or at least about 1.4 mm or at least about 1.5 mm or at least about 1.6 mm or at least about 1.7 mm or at least about 1.8 mm or at least about 1.9 mm or even at least about 2.0 mm. According to yet other embodiments, the inner tuning layer component 110 may have a thickness of not greater than about 4.0 mm, such as, not greater than about 3.9 mm or not greater than about 3.8 mm or not greater than about 3.7 mm or not greater than about 3.6 mm or not greater than about 3.5 mm or not greater than about 3.4 mm or not greater than about 3.3 mm or not greater than about 3.2 mm or not greater than about 3.0 mm or not greater than about 3.0 mm or not greater than about 2.9 mm or not greater than about 2.8 mm or not greater than about 2.7 mm or not greater than about 2.6 mm or even not greater than about 2.5 mm. It will be appreciated that the thickness of the inner tuning layer component 110 may be within a range between any of the minimum and maximum values noted above. It will be further appreciated that the thickness of the inner tuning layer component 110 may be any value between any of the minimum and maximum values noted above.

According to yet other embodiments, the first inner tuning layer 111 of the inner tuning layer component 110 may have a particular thickness. For example, the first inner tuning layer 111 may have a thickness of at least about 0.5 mm, such as, at least about 0.6 mm or at least about 0.7 mm or at least about 0.8 mm or at least about 0.9 mm or at least about 1.0 mm or at least about 1.1 mm or at least about 1.2 mm or at least about 1.3 mm or at least about 1.4 mm or at least about 1.5 mm or at least about 1.6 mm or at least about 1.7 mm or at least about 1.8 mm or at least about 1.9 mm or even at least about 2.0 mm. According to yet other embodiments, the first inner tuning layer 111 may have a thickness of not greater than about 4.0 mm, such as, not greater than about 3.9 mm or not greater than about 3.8 mm or not greater than about 3.7 mm or not greater than about 3.6 mm or not greater than about 3.5 mm or not greater than about 3.4 mm or not greater than about 3.3 mm or not greater than about 3.2 mm or not greater than about 3.0 mm or not greater than about 3.0 mm or not greater than about 2.9 mm or not greater than about 2.8 mm or not greater than about 2.7 mm or not greater than about 2.6 mm or even not greater than about 2.5 mm. It will be appreciated that the thickness of the first inner tuning layer 111 may be within a range between any of the minimum and maximum values noted above. It will be further appreciated that the thickness of the first inner tuning layer 111 may be any value between any of the minimum and maximum values noted above.

Referring now to the first outer tuning layer 131 of the outer tuning layer component 130, according to certain embodiments, the third fiber-reinforced polymer of the first outer tuning layer 131 may include a third polymer component and a third fiber component.

According to certain embodiments, the third polymer component of the third fiber-reinforced polymer may include an epoxy. According to still other embodiments, the third polymer component of the third fiber-reinforced polymer may include a cyanate ester resin. According to yet other embodiments, the third polymer component of the third fiber-reinforced polymer may include a combination of an epoxy and a cyanate ester resin. According to yet other embodiments, the third polymer component of the third fiber-reinforced polymer may consist essentially of an epoxy. According to still other embodiments, the third polymer component of the third fiber-reinforced polymer may consist essentially of a cyanate ester resin. According to yet other embodiments, the third polymer component of the third fiber-reinforced polymer may consist essentially of a combination of an epoxy and a cyanate ester resin.

According to yet other embodiments, the third fiber component of the third fiber-reinforced polymer may include a high-modulus polypropylene (HMPP) fabric, a unidirectional ribbon of HMPP, a hybrid weave of HMPP with at least one of E-glass, S-glass, basalt, or quartz fibers, or combinations thereof. According to yet other embodiments, the third fiber component of the third fiber-reinforced polymer may consist essentially of a high-modulus polypropylene (HMPP) fabric, a unidirectional ribbon of HMPP, a hybrid weave of HMPP with at least one of E-glass, S-glass, basalt, or quartz fibers, or combinations thereof.

According to still other embodiments, the outer tuning layer component 130 may have a particular thickness. For example, the outer tuning layer component 130 may have a thickness of at least about 0.5 mm, such as, at least about 0.6 mm or at least about 0.7 mm or at least about 0.8 mm or at least about 0.9 mm or at least about 1.0 mm or at least about 1.1 mm or at least about 1.2 mm or at least about 1.3 mm or at least about 1.4 mm or at least about 1.5 mm or at least about 1.6 mm or at least about 1.7 mm or at least about 1.8 mm or at least about 1.9 mm or even at least about 2.0 mm. According to yet other embodiments, the outer tuning layer component 130 may have a thickness of not greater than about 4.0 mm, such as, not greater than about 3.9 mm or not greater than about 3.8 mm or not greater than about 3.7 mm or not greater than about 3.6 mm or not greater than about 3.5 mm or not greater than about 3.4 mm or not greater than about 3.3 mm or not greater than about 3.2 mm or not greater than about 3.0 mm or not greater than about 3.0 mm or not greater than about 2.9 mm or not greater than about 2.8 mm or not greater than about 2.7 mm or not greater than about 2.6 mm or even not greater than about 2.5 mm. It will be appreciated that the thickness of the outer tuning layer component 130 may be within a range between any of the minimum and maximum values noted above. It will be further appreciated that the thickness of the outer tuning layer component 130 may be any value between any of the minimum and maximum values noted above.

According to yet other embodiments, the first outer tuning layer 131 of the outer tuning layer component 130 may have a particular thickness. For example, the first outer tuning layer 131 may have a thickness of at least about 0.5 mm, such as, at least about 0.6 mm or at least about 0.7 mm or at least about 0.8 mm or at least about 0.9 mm or at least about 1.0 mm or at least about 1.1 mm or at least about 1.2 mm or at least about 1.3 mm or at least about 1.4 mm or at least about 1.5 mm or at least about 1.6 mm or at least about 1.7 mm or at least about 1.8 mm or at least about 1.9 mm or even at least about 2.0 mm. According to yet other embodiments, the first outer tuning layer 131 may have a thickness of not greater than about 4.0 mm, such as, not greater than about 3.9 mm or not greater than about 3.8 mm or not greater than about 3.7 mm or not greater than about 3.6 mm or not greater than about 3.5 mm or not greater than about 3.4 mm or not greater than about 3.3 mm or not greater than about 3.2 mm or not greater than about 3.0 mm or not greater than about 3.0 mm or not greater than about 2.9 mm or not greater than about 2.8 mm or not greater than about 2.7 mm or not greater than about 2.6 mm or even not greater than about 2.5 mm. It will be appreciated that the thickness of the first outer tuning layer 131 may be within a range between any of the minimum and maximum values noted above. It will be further appreciated that the thickness of the first outer tuning layer 131 may be any value between any of the minimum and maximum values noted above.

Figure 1B:
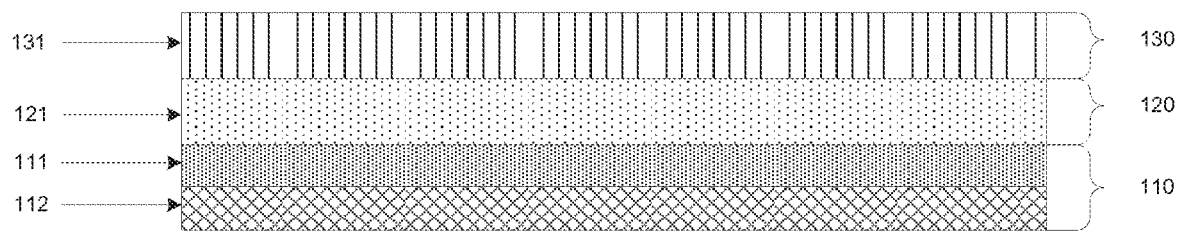

For purposes of further illustration, FIG. 1b includes an illustration of a radome structure 101 according to an alternative embodiment described herein. According to certain embodiments, and as shown in FIG. 1b, a radome structure 101 may include a structural component 120, an inner tuning layer component 110 underlying the structural component 120, and an outer tuning layer component 130 overlying the structural component 120. According to certain embodiments, and as also shown in FIG. 1b, the structural component 120 may include a first fiber-reinforced dielectric layer 121 that may include a first fiber-reinforced polymer. According to still other embodiments, and as further shown in FIG. 1b, the inner tuning layer component 110 may include a first inner tuning layer 111 and a second inner tuning layer 112. The first inner tuning layer 111 may include a second fiber-reinforced polymer and the second inner tuning layer 112 may include a polymer foam layer. According to yet other embodiments, and as further shown in FIG. 1b, the outer tuning layer component 130 may include a first outer tuning layer 131 that may include a third fiber-reinforced polymer.

It will be appreciated that the radome structure 101 and all components described in reference to the radome structure 101 as shown in FIG. 1b may have any of the characteristics described herein with reference to corresponding components in FIG. 1a. In particular, the characteristics of the radome structure 101, the structural component 120, the first fiber-reinforced dielectric layer 121, the inner tuning layer component 110, the first inner tuning layer 111, the first outer tuning layer component 130, and the first outer tuning layer 131 shown in FIG. 1b may have any of the corresponding characteristics described herein in reference to the radome structure 100, the structural component 120, the first fiber-reinforced dielectric layer 121, the inner tuning layer component 110, the first inner tuning layer 111, the first outer tuning layer component 130, and the first outer tuning layer 131 shown in FIG. 1a, respectively.

Referring now to the second inner tuning layer 112 of the inner tuning layer component 110, according to certain embodiments, the second inner tuning layer 112 may have a particular dielectric constant. For example, the second inner tuning layer 112 may have a dielectric constant of at least about 1.00, such as, at least about 1.05 or at least about 1.10 or at least about 1.15 or at least about 1.20 or at least about 1.25 or at least about 1.30 or at least about 1.35 or at least about 1.40 or at least about 1.45 or at least about 1.50 or at least about 1.55 or at least about 1.6 or at least about 1.65 or at least about 1.7 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. It will be appreciated that the dielectric constant of the second inner tuning layer 112 may be within a range between any of the values noted above. It will be further appreciated that the dielectric constant of the second inner tuning layer 112 may be any value between any of the minimum and maximum values noted above.

According to still other embodiments, the polymer foam layer of the second inner tuning layer 112 may have a particular dielectric constant. For example, the polymer foam layer may have a dielectric constant of at least about 1.00, such as, at least about 1.05 or at least about 1.10 or at least about 1.15 or at least about 1.20 or at least about 1.25 or at least about 1.30 or at least about 1.35 or at least about 1.40 or at least about 1.45 or at least about 1.50 or at least about 1.55 or at least about 1.6 or at least about 1.65 or at least about 1.7 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. It will be appreciated that the dielectric constant of the polymer foam layer may be within a range between any of the values noted above. It will be further appreciated that the dielectric constant of the polymer foam layer may be any value between any of the minimum and maximum values noted above.

According to other embodiments, the second inner tuning layer 112 may have a particular density. For example, the second inner tuning layer 112 may have a density of at least about 2 lbs per cubic foot, such as, at least about 2.5 lbs per cubic foot or at least about 3.0 lbs per cubic foot or at least about 3.5 lbs per cubic foot or at least about 4.0 lbs per cubic foot or even at least about 4.5 lbs per cubic foot. According to yet other embodiments, the second inner tuning layer 112 may have a density of not greater than about 10 lbs per cubic foot, such as, not greater than about 9.5 lbs per cubic foot or not greater than about 9.0 lbs per cubic foot or not greater than about 8.5 lbs per cubic foot or not greater than about 8.0 lbs per cubic foot or not greater than about 7.5 lbs per cubic foot or not greater than about 7.0 lbs per cubic foot or even not greater than about 6.5 lbs per cubic foot. It will be appreciated that the density of the second inner tuning layer 112 may be within a range between any of the minimum and maximum values noted above. It will be further appreciated that the density of the second inner tuning layer 112 may be any value between any of the minimum and maximum values noted above.

According to other embodiments, the polymer foam layer may have a particular density. For example, the polymer foam layer may have a density of at least about 2 lbs per cubic foot, such as, at least about 2.5 lbs per cubic foot or at least about 3.0 lbs per cubic foot or at least about 3.5 lbs per cubic foot or at least about 4.0 lbs per cubic foot or even at least about 4.5 lbs per cubic foot. According to yet other embodiments, the polymer foam layer may have a density of not greater than about 10 lbs per cubic foot, such as, not greater than about 9.5 lbs per cubic foot or not greater than about 9.0 lbs per cubic foot or not greater than about 8.5 lbs per cubic foot or not greater than about 8.0 lbs per cubic foot or not greater than about 7.5 lbs per cubic foot or not greater than about 7.0 lbs per cubic foot or even not greater than about 6.5 lbs per cubic foot. It will be appreciated that the density of the polymer foam layer may be within a range between any of the minimum and maximum values noted above. It will be further appreciated that the density of the polymer foam layer may be any value between any of the minimum and maximum values noted above.

According to still other embodiments, the polymer foam layer of the second inner tuning layer 112 may have a particular dielectric constant. For example, the polymer foam layer may have a dielectric constant of at least about 1.00, such as, at least about 1.05 or at least about 1.10 or at least about 1.15 or at least about 1.20 or at least about 1.25 or at least about 1.30 or at least about 1.35 or at least about 1.40 or at least about 1.45 or at least about 1.50 or at least about 1.55 or at least about 1.6 or at least about 1.65 or at least about 1.7 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. It will be appreciated that the dielectric constant of the polymer foam layer may be within a range between any of the values noted above. It will be further appreciated that the dielectric constant of the polymer foam layer may be any value between any of the minimum and maximum values noted above.

According to yet other embodiments, the second inner tuning layer 112 of the inner tuning layer component 110 may have a particular thickness. For example, the second inner tuning layer 112 may have a thickness of at least about 0.5 mm, such as, at least about 0.6 mm or at least about 0.7 mm or at least about 0.8 mm or at least about 0.9 mm or at least about 1.0 mm or at least about 1.1 mm or at least about 1.2 mm or at least about 1.3 mm or at least about 1.4 mm or at least about 1.5 mm or at least about 1.6 mm or at least about 1.7 mm or at least about 1.8 mm or at least about 1.9 mm or even at least about 2.0 mm. According to yet other embodiments, the second inner tuning layer 112 may have a thickness of not greater than about 4.0 mm, such as, not greater than about 3.9 mm or not greater than about 3.8 mm or not greater than about 3.7 mm or not greater than about 3.6 mm or not greater than about 3.5 mm or not greater than about 3.4 mm or not greater than about 3.3 mm or not greater than about 3.2 mm or not greater than about 3.0 mm or not greater than about 3.0 mm or not greater than about 2.9 mm or not greater than about 2.8 mm or not greater than about 2.7 mm or not greater than about 2.6 mm or even not greater than about 2.5 mm. It will be appreciated that the thickness of the second inner tuning layer 112 may be within a range between any of the minimum and maximum values noted above. It will be further appreciated that the thickness of the second inner tuning layer 112 may be any value between any of the minimum and maximum values noted above.

According to yet other embodiments, the polymer foam layer of the inner tuning layer component 110 may have a particular thickness. For example, the polymer foam layer may have a thickness of at least about 0.5 mm, such as, at least about 0.6 mm or at least about 0.7 mm or at least about 0.8 mm or at least about 0.9 mm or at least about 1.0 mm or at least about 1.1 mm or at least about 1.2 mm or at least about 1.3 mm or at least about 1.4 mm or at least about 1.5 mm or at least about 1.6 mm or at least about 1.7 mm or at least about 1.8 mm or at least about 1.9 mm or even at least about 2.0 mm. According to yet other embodiments, the polymer foam layer may have a thickness of not greater than about 4.0 mm, such as, not greater than about 3.9 mm or not greater than about 3.8 mm or not greater than about 3.7 mm or not greater than about 3.6 mm or not greater than about 3.5 mm or not greater than about 3.4 mm or not greater than about 3.3 mm or not greater than about 3.2 mm or not greater than about 3.0 mm or not greater than about 3.0 mm or not greater than about 2.9 mm or not greater than about 2.8 mm or not greater than about 2.7 mm or not greater than about 2.6 mm or even not greater than about 2.5 mm. It will be appreciated that the thickness of the polymer foam layer may be within a range between any of the minimum and maximum values noted above. It will be further appreciated that the thickness of the polymer foam layer may be any value between any of the minimum and maximum values noted above.

Figure 2A:
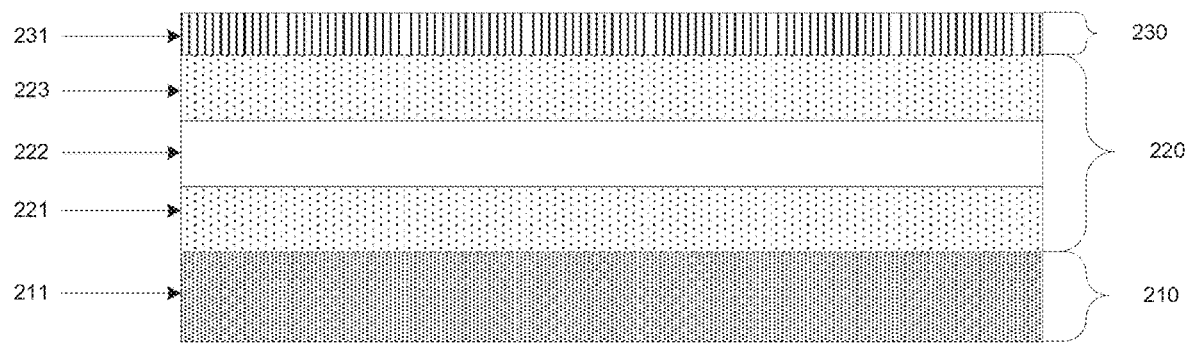
FIGS. 2a & 2b include illustrations of a radome structure according to embodiments described herein.

For purposes of further illustration, FIG. 2a includes an illustration of a radome structure 200 according to yet another alternative embodiment described herein. According to certain embodiments, and as shown in FIG. 2a, a radome structure 200 may include a structural component 220, an inner tuning layer component 210 underlying the structural component 220, and an outer tuning layer component 230 overlying the structural component 220. According to certain embodiments, and as also shown in FIG. 2a, the structural component 220 may include a first fiber-reinforced dielectric layer 221, a first low-dielectric constant layer 222 overlying the first fiber-reinforcement dielectric layer 221, and a second fiber-reinforced dielectric layer 223. The first fiber-reinforced dielectric layer 221 may include a first fiber-reinforced polymer and the second fiber-reinforced dielectric layer 223 may include a fourth fiber-reinforced polymer. According to still other embodiments, and as further shown in FIG. 2a, the inner tuning layer component 210 may include a first inner tuning layer 211 that may include a second fiber-reinforced polymer. According to yet other embodiments, and as further shown in FIG. 2a, the outer tuning layer component 230 may include a first outer tuning layer 231 that may include a third fiber-reinforced polymer.

It will be appreciated that the radome structure 200 and all components described in reference to the radome structure 200 as shown in FIG. 2a may have any of the characteristics described herein with reference to corresponding components in FIGS. 1a and 1b. In particular, the characteristics of the radome structure 200, the structural component 220, the first fiber-reinforced dielectric layer 221, the inner tuning layer component 210, the first inner tuning layer 211, the first outer tuning layer component 230, and the first outer tuning layer 231 shown in FIG. 2a may have any of the corresponding characteristics described herein in reference to the radome structure 100 (101), the structural component 120, the first fiber-reinforced dielectric layer 121, the inner tuning layer component 110, the first inner tuning layer 111, the second inner tuning layer 112, the first outer tuning layer component 130, and the first outer tuning layer 131 shown in FIG. 1a and/or FIG. 1b, respectively.

Referring now to the first fiber-reinforced dielectric layer 221 of the structural component 220, according to certain embodiments, the first fiber-reinforced dielectric layer 221 may include a high dielectric constant material.

According to particular embodiments, the high dielectric material of the first fiber-reinforced dielectric layer 221 may have a particular dielectric constant. For example, the dielectric constant of the high dielectric material may be at least about 2.5, such as, at least about 2.8 or at least about 3.0 or at least about 3.3 or at least about 3.5 or at least about 3.8 or even at least about 4.0. According to yet other embodiment, the dielectric constant of the high dielectric material may be not greater than about 8.0, such as, not greater than about 7.7 or not greater than about 7.5 or not greater than about 7.2 or not greater than about 7.0 or not greater than about 6.7 or not greater than about 6.5 or not greater than about 6.2 or even not greater than about 6.0. It will be appreciated that the dielectric constant of the high dielectric material may be within a range between any of the values noted above. It will be further appreciated that the dielectric constant of the high dielectric material may be any value between any of the minimum and maximum values noted above.

According to still other embodiments, the first fiber-reinforced dielectric layer 221 may have a particular dielectric constant. For example, the dielectric constant of the first fiber-reinforced dielectric layer 221 may be at least about 2.5, such as, at least about 2.8 or at least about 3.0 or at least about 3.3 or at least about 3.5 or at least about 3.8 or even at least about 4.0. According to yet other embodiment, the dielectric constant of the first fiber-reinforced dielectric layer 221 may be not greater than about 8.0, such as, not greater than about 7.7 or not greater than about 7.5 or not greater than about 7.2 or not greater than about 7.0 or not greater than about 6.7 or not greater than about 6.5 or not greater than about 6.2 or even not greater than about 6.0. It will be appreciated that the dielectric constant of the first fiber-reinforced dielectric layer 221 may be within a range between any of the values noted above. It will be further appreciated that the dielectric constant of the first fiber-reinforced dielectric layer 221 may be any value between any of the minimum and maximum values noted above.

According to yet other embodiments, the first fiber-reinforced dielectric layer 221 may have a particular thickness. For example, first fiber-reinforced dielectric layer 221 may have a thickness of at least about 0.1 mm, such as, at least about 0.2 mm or at least about 0.3 mm or at least about 0.4 mm or at least about 0.5 mm or at least about 0.6 mm or at least about 0.7 mm or at least about 0.8 mm or at least about 0.9 mm or at least about 1.0 mm. According to yet other embodiments, the first fiber-reinforced dielectric layer 221 may have a thickness of not greater than about 5.0 mm, such as, not greater than about 4.5 mm or not greater than about 4.0 mm or not greater than about 3.5 mm or not greater than about 3.0 mm or even not greater than about 2.5 mm. It will be further appreciated that the thickness of the first fiber-reinforced dielectric layer 221 may be any value between any of the minimum and maximum values noted above.

Referring now to the first low-dielectric constant layer 222 of the structural component 220, according to certain embodiments, the first low-dielectric constant layer 222 may include a low dielectric constant material.

According to particular embodiments, the low dielectric material of the first low-dielectric constant layer 222 may have a particular dielectric constant. For example, the dielectric constant of the low dielectric material may be at least about 1.1, such as, at least about 1.2 or at least about 1.3 or at least about 1.4 or at least about 1.5 or at least about 1.6 or at least about 1.7 or at least about 1.8 or at least about 1.9 or at least about 2.0 or at least about 2.1 or at least about 2.2 or at least about 2.3 or even at least about 2.4. According to yet other embodiment, the dielectric constant of the low dielectric material may be not greater than about 5.0, such as, not greater than about 4.9 or not greater than about 4.8 or not greater than about 4.7 or not greater than about 4.6 or not greater than about 4.5 or not greater than about 4.4 or not greater than about 4.3 or not greater than about 4.2 or not greater than about 4.1 or not greater than about 4.0 or not greater than about 3.9 or not greater than about 3.8 or not greater than about 3.7 or not greater than about 3.6 or not greater than about 3.5 or not greater than about 3.4 or not greater than about 3.3 or not greater than about 3.2 or not greater than about 3.1 or not greater than about 3.0 or not greater than about 2.9 or not greater than about 2.8 or not greater than about 2.7 or even not greater than about 2.6. It will be appreciated that the dielectric constant of the low dielectric material may be within a range between any of the values noted above. It will be further appreciated that the dielectric constant of the low dielectric material may be any value between any of the minimum and maximum values noted above.

According to particular embodiments, the first low-dielectric constant layer 222 may have a particular dielectric constant. For example, the dielectric constant of the first low-dielectric constant layer 222 may be at least about 1.1, such as, at least about 1.2 or at least about 1.3 or at least about 1.4 or at least about 1.5 or at least about 1.6 or at least about 1.7 or at least about 1.8 or at least about 1.9 or at least about 2.0 or at least about 2.1 or at least about 2.2 or at least about 2.3 or even at least about 2.4. According to yet other embodiment, the dielectric constant of the first low-dielectric constant layer 222 may be not greater than about 5.0, such as, not greater than about 4.9 or not greater than about 4.8 or not greater than about 4.7 or not greater than about 4.6 or not greater than about 4.5 or not greater than about 4.4 or not greater than about 4.3 or not greater than about 4.2 or not greater than about 4.1 or not greater than about 4.0 or not greater than about 3.9 or not greater than about 3.8 or not greater than about 3.7 or not greater than about 3.6 or not greater than about 3.5 or not greater than about 3.4 or not greater than about 3.3 or not greater than about 3.2 or not greater than about 3.1 or not greater than about 3.0 or not greater than about 2.9 or not greater than about 2.8 or not greater than about 2.7 or even not greater than about 2.6. It will be appreciated that the dielectric constant of the first low-dielectric constant layer 222 may be within a range between any of the values noted above. It will be further appreciated that the dielectric constant of the first low-dielectric constant layer 222 may be any value between any of the minimum and maximum values noted above.

According to particular embodiments, the low dielectric material of the first low-dielectric constant layer 222 may include a polymer foam. According to yet other embodiments, the low dielectric material of the first low-dielectric constant layer 222 may include a syntactic foam. According to still other embodiments, the low dielectric material of the first low-dielectric constant layer 222 may include a HMPP-reinforced polymer. According to particular embodiments, the low dielectric material of the first low-dielectric constant layer 222 may consist essentially of a polymer foam. According to yet other embodiments, the low dielectric material of the first low-dielectric constant layer 222 may consist essentially of a syntactic foam. According to still other embodiments, the low dielectric material of the first low-dielectric constant layer 222 may consist essentially of a HMPP-reinforced polymer.

According to particular embodiments, the first low-dielectric constant layer 222 may include a polymer foam. According to yet other embodiments, the first low-dielectric constant layer 222 may include a syntactic foam. According to still other embodiments, the first low-dielectric constant layer 222 may include a HMPP-reinforced polymer. According to particular embodiments, the first low-dielectric constant layer 222 may consist essentially of a polymer foam. According to yet other embodiments, the first low-dielectric constant layer 222 may consist essentially of a syntactic foam. According to still other embodiments, the first low-dielectric constant layer 222 may consist essentially of a HMPP-reinforced polymer.

According to yet other embodiments, the first low-dielectric constant layer 222 may have a particular thickness. For example, the first low-dielectric constant layer 222 may have a thickness of at least about 0.1 mm, such as at least about 0.2 mm or at least about 0.3 mm or at least about 0.4 mm or at least about 0.5 mm or at least about 0.6 mm or at least about 0.7 mm or at least about 0.8 mm or at least about 0.9 mm or at least about 1.0 mm. According to still other embodiments, the first low-dielectric constant layer 222 may have a thickness of not greater than about 5.0 mm, such as, not greater than about 4.5 mm or not greater than about 4.0 mm or not greater than about 3.5 mm or not greater than about 3.0 mm or even not greater than about 2.5 mm. It will be appreciated that the thickness of the first low-dielectric constant layer 222 may be within a range between any of the minimum and maximum values noted above. It will be further appreciated that the thickness of the first low-dielectric constant layer 222 may be any value between any of the minimum and maximum values noted above.

Referring now to the second fiber-reinforced dielectric layer 223, according to certain embodiments, the second fiber-reinforced dielectric layer 223 may include a high dielectric constant material.

According to particular embodiments, the high dielectric material of the second fiber-reinforced dielectric layer 223 may have a particular dielectric constant. For example, the dielectric constant of the high dielectric material may be at least about 2.5, such as, at least about 2.8 or at least about 3.0 or at least about 3.3 or at least about 3.5 or at least about 3.8 or even at least about 4.0. According to yet other embodiment, the dielectric constant of the high dielectric material may be not greater than about 8.0, such as, not greater than about 7.7 or not greater than about 7.5 or not greater than about 7.2 or not greater than about 7.0 or not greater than about 6.7 or not greater than about 6.5 or not greater than about 6.2 or even not greater than about 6.0. It will be appreciated that the dielectric constant of the high dielectric material may be within a range between any of the values noted above. It will be further appreciated that the dielectric constant of the high dielectric material may be any value between any of the minimum and maximum values noted above.

According to still other embodiments, the second fiber-reinforced dielectric layer 223 may have a particular dielectric constant. For example, the dielectric constant of the second fiber-reinforced dielectric layer 223 may be at least about 2.5, such as, at least about 2.8 or at least about 3.0 or at least about 3.3 or at least about 3.5 or at least about 3.8 or even at least about 4.0. According to yet other embodiment, the dielectric constant of the second fiber-reinforced dielectric layer 223 may be not greater than about 8.0, such as, not greater than about 7.7 or not greater than about 7.5 or not greater than about 7.2 or not greater than about 7.0 or not greater than about 6.7 or not greater than about 6.5 or not greater than about 6.2 or even not greater than about 6.0. It will be appreciated that the dielectric constant of the second fiber-reinforced dielectric layer 223 may be within a range between any of the values noted above. It will be further appreciated that the dielectric constant of the second fiber-reinforced dielectric layer 223 may be any value between any of the minimum and maximum values noted above.

According to yet other embodiments, the second fiber-reinforced dielectric layer 223 may include a fourth fiber-reinforced polymer. According to yet other embodiments, the fourth fiber-reinforced polymer of the second fiber-reinforced dielectric layer 223 may include a fourth polymer component and a fourth fiber component.

According to certain embodiments, the fourth polymer component of the fourth fiber-reinforced polymer may include an epoxy. According to still other embodiments, the fourth polymer component of the fourth fiber-reinforced polymer may include a cyanate ester resin. According to yet other embodiments, the fourth polymer component of the fourth fiber-reinforced polymer may include a combination of an epoxy and a cyanate ester resin. According to yet other embodiments, the fourth polymer component of the fourth fiber-reinforced polymer may consist essentially of an epoxy. According to still other embodiments, the fourth polymer component of the fourth fiber-reinforced polymer may consist essentially of a cyanate ester resin. According to yet other embodiments, the fourth polymer component of the fourth fiber-reinforced polymer may consist essentially of a combination of an epoxy and a cyanate ester resin.

According to yet other embodiments, the fourth fiber component of the fourth fiber-reinforced polymer may include a high-modulus polypropylene (HMPP) fabric, a unidirectional ribbon of HMPP, a hybrid weave of HMPP with at least one of E-glass, S-glass, basalt, or quartz fibers, or combinations thereof. According to yet other embodiments, the fourth fiber component of the fourth fiber-reinforced polymer may consist essentially of a high-modulus polypropylene (HMPP) fabric, a unidirectional ribbon of HMPP, a hybrid weave of HMPP with at least one of E-glass, S-glass, basalt, or quartz fibers, or combinations thereof.

According to yet other embodiments, the second fiber-reinforced dielectric layer 223 may have a particular thickness. For example, the second fiber-reinforced dielectric layer 223 may have a thickness of at least about 0.1 mm, such as, at least about 0.2 mm or at least about 0.3 mm or at least about 0.4 mm or at least about 0.5 mm or at least about 0.6 mm or at least about 0.7 mm or at least about 0.8 mm or at least about 0.9 mm or at least about 1.0 mm. According to still other embodiments, the second fiber-reinforced dielectric layer 223 may have a thickness of not greater than about 5.0 mm, such as, not greater than about 4.5 mm or not greater than about 4.0 mm or not greater than about 3.5 mm or not greater than about 3.0 mm or even not greater than about 2.5 mm. It will be appreciated that the thickness of the second fiber-reinforced dielectric layer 223 may be within a range between any of the minimum and maximum values noted above. It will be further appreciated that the thickness of the second fiber-reinforced dielectric layer 223 may be any value between any of the minimum and maximum values noted above.

Figure 2B:
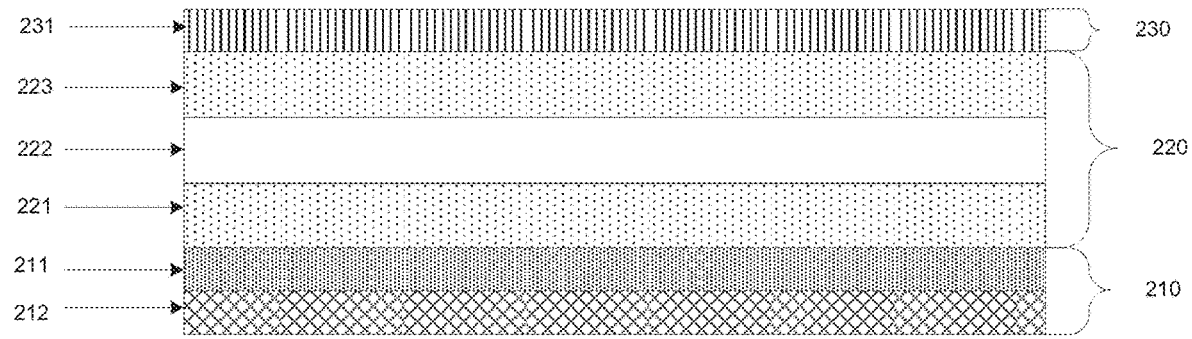

For purposes of further illustration, FIG. 2b includes an illustration of a radome structure 201 according to yet another alternative embodiment described herein. According to certain embodiments, and as shown in FIG. 2b, a radome structure 201 may include a structural component 220, an inner tuning layer component 210 underlying the structural component 220, and an outer tuning layer component 230 overlying the structural component 220. According to certain embodiments, and as also shown in FIG. 2a, the structural component 220 may include a first fiber-reinforced dielectric layer 221, a first low-dielectric constant layer 222 overlying the first fiber-reinforcement dielectric layer 221, and a second fiber-reinforced dielectric layer 223. According to still other embodiments, and as further shown in FIG. 2b, the inner tuning layer component 210 may include a first inner tuning layer 211 and a second inner tuning layer 212. The first inner tuning layer 211 may include a second fiber-reinforced polymer and the second inner tuning layer 212 may include a polymer foam layer. According to yet other embodiments, and as further shown in FIG. 2b, the outer tuning layer component 230 may include a first outer tuning layer 231 that may include a third fiber-reinforced polymer.

It will be appreciated that the radome structure 201 and all components described in reference to the radome structure 201 as shown in FIG. 2b may have any of the characteristics described herein with reference to corresponding components in FIG. 1a, FIG. 1b and FIG. 2a. In particular, the characteristics of the radome structure 201, the structural component 220, the first fiber-reinforced dielectric layer 221, the first low-dielectric constant layer 222, the second fiber-reinforced dielectric layer 223, the inner tuning layer component 210, the first inner tuning layer 211, the second inner tuning layer 212, the first outer tuning layer component 230, and the first outer tuning layer 231 shown in FIG. 2b may have any of the corresponding characteristics described herein in reference to the radome structure 200 (101) (100), the structural component 220 (120), the first fiber-reinforced dielectric layer 221 (121), the first low-dielectric constant layer 222 (122), the second fiber-reinforced dielectric layer 223 (123), the inner tuning layer component 210 (110), the first inner tuning layer 211 (111), the second inner tuning layer 212 (112), the first outer tuning layer component 230 (130), and the first outer tuning layer 231 (131) shown in FIG. 1a, FIG. 1b, and/or FIG. 2a, respectively.

Figure 3A:
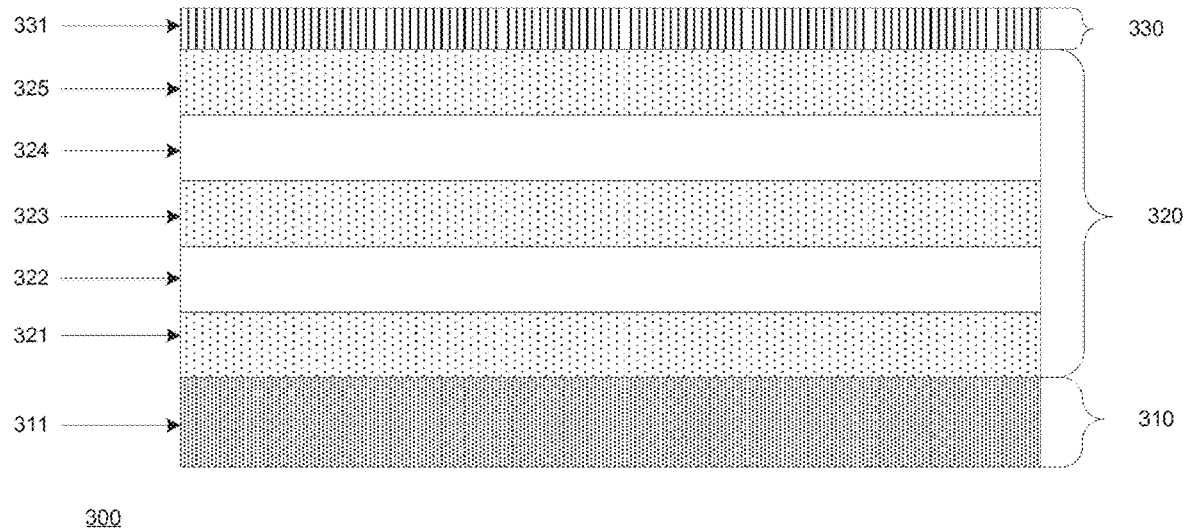
FIGS. 3a & 3b include illustrations of a radome structure according to embodiments described herein.

For purposes of further illustration, FIG. 3a includes an illustration of a radome structure 300 according to an alternative embodiment described herein. According to certain embodiments, and as shown in FIG. 3a, a radome structure 300 may include a structural component 320, an inner tuning layer component 310 underlying the structural component 320, and an outer tuning layer component 330 overlying the structural component 320. According to certain embodiments, and as also shown in FIG. 3a, the structural component 320 may include a first fiber-reinforced dielectric layer 321, a first low-dielectric constant layer 322 overlying the first fiber-reinforcement dielectric layer 321, a second fiber-reinforced dielectric layer 323 overlying the first low-dielectric constant layer 322, a second low-dielectric constant layer 324 overlying the second fiber-reinforcement dielectric layer 323, a third fiber-reinforced dielectric layer 325 overlying the second low-dielectric constant layer 324. The first fiber-reinforced dielectric layer 321 may include a first fiber-reinforced polymer, the second fiber-reinforced dielectric layer 323 may include a fourth fiber-reinforced polymer, and the third fiber-reinforced dielectric layer 325 may include a fifth fiber-reinforced polymer. According to still other embodiments, and as further shown in FIG. 3a, the inner tuning layer component 310 may include a first inner tuning layer 311 that may include a second fiber-reinforced polymer. According to yet other embodiments, and as further shown in FIG. 3a, the outer tuning layer component 330 may include a first outer tuning layer 331 that may include a third fiber-reinforced polymer.

It will be appreciated that the radome structure 300 and all components described in reference to the radome structure 300 as shown in FIG. 3a may have any of the characteristics described herein with reference to corresponding components in FIG. 1a, FIG. 1b, FIG. 2a and FIG. 2b. In particular, the characteristics of the radome structure 300, the structural component 320, the first fiber-reinforced dielectric layer 321, the first low-dielectric constant layer 322, the second fiber-reinforced dielectric layer 323, the inner tuning layer component 310, the first inner tuning layer 311, the second inner tuning layer 312, the first outer tuning layer component 330, and the first outer tuning layer 331 shown in FIG. 3a may have any of the corresponding characteristics described herein in reference to the radome structure 200 (201) (100) (101), the structural component 220 (120), the first fiber-reinforced dielectric layer 221 (121), the first low-dielectric constant layer 222 (122), the second fiber-reinforced dielectric layer 223 (123), the inner tuning layer component 210 (110), the first inner tuning layer 211 (111), the second inner tuning layer 212 (112), the first outer tuning layer component 230 (130), and the first outer tuning layer 231 (131) shown in FIG. 1a, FIG. 1b, FIG. 2a, and/or FIG. 2b, respectively.

Referring now to the second low-dielectric constant layer 324 of the structural component 320, according to certain embodiments, the second low-dielectric constant layer 324 may include a low dielectric constant material.

According to particular embodiments, the low dielectric material of the second low-dielectric constant layer 324 may have a particular dielectric constant. For example, the dielectric constant of the low dielectric material may be at least about 1.1, such as, at least about 1.2 or at least about 1.3 or at least about 1.4 or at least about 1.5 or at least about 1.6 or at least about 1.7 or at least about 1.8 or at least about 1.9 or at least about 2.0 or at least about 2.1 or at least about 2.2 or at least about 2.3 or even at least about 2.4. According to yet other embodiment, the dielectric constant of the low dielectric material may be not greater than about 5.0, such as, not greater than about 4.9 or not greater than about 4.8 or not greater than about 4.7 or not greater than about 4.6 or not greater than about 4.5 or not greater than about 4.4 or not greater than about 4.3 or not greater than about 4.2 or not greater than about 4.1 or not greater than about 4.0 or not greater than about 3.9 or not greater than about 3.8 or not greater than about 3.7 or not greater than about 3.6 or not greater than about 3.5 or not greater than about 3.4 or not greater than about 3.3 or not greater than about 3.2 or not greater than about 3.1 or not greater than about 3.0 or not greater than about 2.9 or not greater than about 2.8 or not greater than about 2.7 or even not greater than about 2.6. It will be appreciated that the dielectric constant of the low dielectric material may be within a range between any of the values noted above. It will be further appreciated that the dielectric constant of the low dielectric material may be any value between any of the minimum and maximum values noted above.

According to particular embodiments, the second low-dielectric constant layer 324 may have a particular dielectric constant. For example, the dielectric constant of the second low-dielectric constant layer 324 may be at least about 1.1, such as, at least about 1.2 or at least about 1.3 or at least about 1.4 or at least about 1.5 or at least about 1.6 or at least about 1.7 or at least about 1.8 or at least about 1.9 or at least about 2.0 or at least about 2.1 or at least about 2.2 or at least about 2.3 or even at least about 2.4. According to yet other embodiment, the dielectric constant of the second low-dielectric constant layer 324 may be not greater than about 5.0, such as, not greater than about 4.9 or not greater than about 4.8 or not greater than about 4.7 or not greater than about 4.6 or not greater than about 4.5 or not greater than about 4.4 or not greater than about 4.3 or not greater than about 4.2 or not greater than about 4.1 or not greater than about 4.0 or not greater than about 3.9 or not greater than about 3.8 or not greater than about 3.7 or not greater than about 3.6 or not greater than about 3.5 or not greater than about 3.4 or not greater than about 3.3 or not greater than about 3.2 or not greater than about 3.1 or not greater than about 3.0 or not greater than about 2.9 or not greater than about 2.8 or not greater than about 2.7 or even not greater than about 2.6. It will be appreciated that the dielectric constant of the second low-dielectric constant layer 324 may be within a range between any of the values noted above. It will be further appreciated that the dielectric constant of the second low-dielectric constant layer 324 may be any value between any of the minimum and maximum values noted above.

According to particular embodiments, the low dielectric material of the second low-dielectric constant layer 324 may include a polymer foam. According to yet other embodiments, the low dielectric material of the second low-dielectric constant layer 324 may include a syntactic foam. According to still other embodiments, the low dielectric material of the second low-dielectric constant layer 324 may include a HMPP-reinforced polymer. According to particular embodiments, the low dielectric material of the second low-dielectric constant layer 324 may consist essentially of a polymer foam. According to yet other embodiments, the low dielectric material of the second low-dielectric constant layer 324 may consist essentially of a syntactic foam. According to still other embodiments, the low dielectric material of the second low-dielectric constant layer 324 may consist essentially of a HMPP-reinforced polymer.

According to particular embodiments, the second low-dielectric constant layer 324 may include a polymer foam. According to yet other embodiments, the second low-dielectric constant layer 324 may include a syntactic foam. According to still other embodiments, the second low-dielectric constant layer 324 may include a HMPP-reinforced polymer. According to particular embodiments, the second low-dielectric constant layer 324 may consist essentially of a polymer foam. According to yet other embodiments, the second low-dielectric constant layer 324 may consist essentially of a syntactic foam. According to still other embodiments, the second low-dielectric constant layer 324 may consist essentially of a HMPP-reinforced polymer.

According to yet other embodiments, the second low-dielectric constant layer 324 may have a particular thickness. For example, the second low-dielectric constant layer 324 may have a thickness of at least about 0.1 mm, such as, at least about 0.2 mm or at least about 0.3 mm or at least about 0.4 mm or at least about 0.5 mm or at least about 0.6 mm or at least about 0.7 mm or at least about 0.8 mm or at least about 0.9 mm or at least about 1.0 mm. According to still other embodiments, the second low-dielectric constant layer 324 may have a thickness of not greater than about 5.0 mm, such as, not greater than about 4.5 mm or not greater than about 4.0 mm or not greater than about 3.5 mm or not greater than about 3.0 mm or even not greater than about 2.5 mm. It will be appreciated that the thickness of the second low-dielectric constant layer 324 may be within a range between any of the minimum and maximum values noted above. It will be further appreciated that the thickness of the second low-dielectric constant layer 324 may be any value between any of the minimum and maximum values noted above.

Referring now to the third fiber-reinforced dielectric layer 325, according to certain embodiments, the third fiber-reinforced dielectric layer 325 may include a high dielectric constant material.

According to particular embodiments, the high dielectric material of the third fiber-reinforced dielectric layer 325 may have a particular dielectric constant. For example, the dielectric constant of the high dielectric material may be at least about 2.5, such as, at least about 2.8 or at least about 3.0 or at least about 3.3 or at least about 3.5 or at least about 3.8 or even at least about 4.0. According to yet other embodiment, the dielectric constant of the high dielectric material may be not greater than about 8.0, such as, not greater than about 7.7 or not greater than about 7.5 or not greater than about 7.2 or not greater than about 7.0 or not greater than about 6.7 or not greater than about 6.5 or not greater than about 6.2 or even not greater than about 6.0. It will be appreciated that the dielectric constant of the high dielectric material may be within a range between any of the values noted above. It will be further appreciated that the dielectric constant of the high dielectric material may be any value between any of the minimum and maximum values noted above.

According to still other embodiments, the third fiber-reinforced dielectric layer 325 may have a particular dielectric constant. For example, the dielectric constant of the third fiber-reinforced dielectric layer 325 may be at least about 2.5, such as, at least about 2.8 or at least about 3.0 or at least about 3.3 or at least about 3.5 or at least about 3.8 or even at least about 4.0. According to yet other embodiment, the dielectric constant of the third fiber-reinforced dielectric layer 325 may be not greater than about 8.0, such as, not greater than about 7.7 or not greater than about 7.5 or not greater than about 7.2 or not greater than about 7.0 or not greater than about 6.7 or not greater than about 6.5 or not greater than about 6.2 or even not greater than about 6.0. It will be appreciated that the dielectric constant of the third fiber-reinforced dielectric layer 325 may be within a range between any of the values noted above. It will be further appreciated that the dielectric constant of the third fiber-reinforced dielectric layer 325 may be any value between any of the minimum and maximum values noted above.

According to yet other embodiments, the third fiber-reinforced dielectric layer 325 may include a fifth fiber-reinforced polymer. According to yet other embodiments, the fifth fiber-reinforced polymer of the third fiber-reinforced dielectric layer 325 may include a fifth polymer component and a fifth fiber component.

According to certain embodiments, the fifth polymer component of the fifth fiber-reinforced polymer may include an epoxy. According to still other embodiments, the fifth polymer component of the fifth fiber-reinforced polymer may include a cyanate ester resin. According to yet other embodiments, the fifth polymer component of the fifth fiber-reinforced polymer may include a combination of an epoxy and a cyanate ester resin. According to yet other embodiments, the fifth polymer component of the fifth fiber-reinforced polymer may consist essentially of an epoxy. According to still other embodiments, the fifth polymer component of the fifth fiber-reinforced polymer may consist essentially of a cyanate ester resin. According to yet other embodiments, the fifth polymer component of the fifth fiber-reinforced polymer may consist essentially of a combination of an epoxy and a cyanate ester resin.

According to yet other embodiments, the fifth fiber component of the fifth fiber-reinforced polymer may include a high-modulus polypropylene (HMPP) fabric, a unidirectional ribbon of HMPP, a hybrid weave of HMPP with at least one of E-glass, S-glass, basalt, or quartz fibers, or combinations thereof. According to yet other embodiments, the fifth fiber component of the fifth fiber-reinforced polymer may consist essentially of a high-modulus polypropylene (HMPP) fabric, a unidirectional ribbon of HMPP, a hybrid weave of HMPP with at least one of E-glass, S-glass, basalt, or quartz fibers, or combinations thereof.

According to yet other embodiments, the third fiber-reinforced dielectric layer 325 may have a particular thickness. For example, the third fiber-reinforced dielectric layer 325 may have a thickness of at least about 0.1 mm, such as, at least about 0.2 mm or at least about 0.3 mm or at least about 0.4 mm or at least about 0.5 mm or at least about 0.6 mm or at least about 0.7 mm or at least about 0.8 mm or at least about 0.9 mm or at least about 1.0 mm. According to still other embodiments, the third fiber-reinforced dielectric layer 325 may have a thickness of not greater than about 5.0 mm, such as, not greater than about 4.5 mm or not greater than about 4.0 mm or not greater than about 3.5 mm or not greater than about 3.0 mm or even not greater than about 2.5 mm. It will be appreciated that the thickness of the third fiber-reinforced dielectric layer 325 may be within a range between any of the minimum and maximum values noted above. It will be further appreciated that the thickness of the third fiber-reinforced dielectric layer 325 may be any value between any of the minimum and maximum values noted above.

Figure 3B:
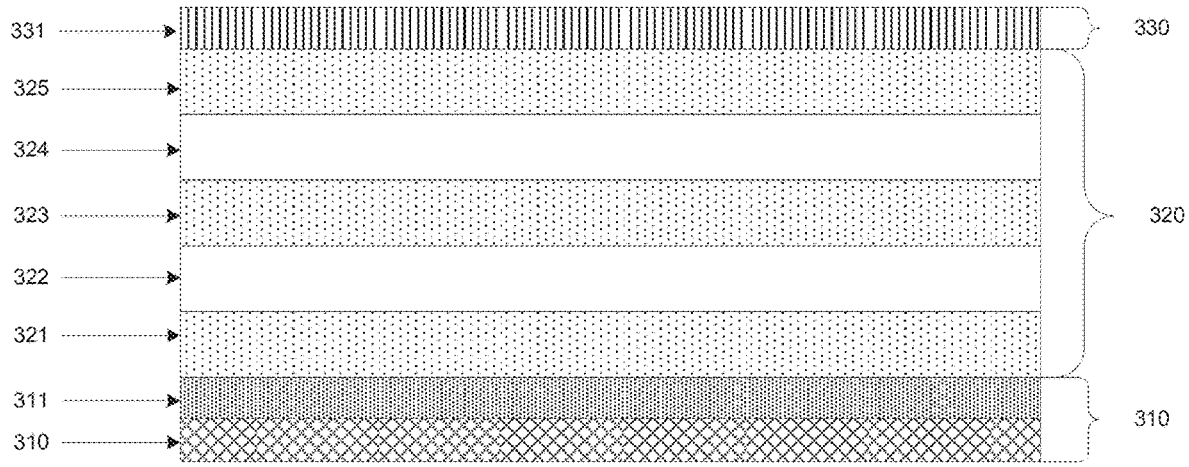

For purposes of further illustration, FIG. 3b includes an illustration of a radome structure 301 according to yet another alternative embodiment described herein. According to certain embodiments, and as shown in FIG. 3b, a radome structure 301 may include a structural component 320, an inner tuning layer component 310 underlying the structural component 320, and an outer tuning layer component 330 overlying the structural component 320. According to certain embodiments, and as also shown in FIG. 3b, the structural component 320 may include a first fiber-reinforced dielectric layer 321, a first low-dielectric constant layer 322 overlying the first fiber-reinforcement dielectric layer 321, a second fiber-reinforced dielectric layer 323 overlying the first low-dielectric constant layer 322, a second low-dielectric constant layer 324 overlying the second fiber-reinforcement dielectric layer 323, a third fiber-reinforced dielectric layer 325 overlying the second low-dielectric constant layer 324. According to still other embodiments, and as further shown in FIG. 3b, the inner tuning layer component 310 may include a first inner tuning layer 311 and a second inner tuning layer 312. The first inner tuning layer 311 may include a second fiber-reinforced polymer and the second inner tuning layer 312 may include a polymer foam layer. According to yet other embodiments, and as further shown in FIG. 3b, the outer tuning layer component 330 may include a first outer tuning layer 331 that may include a third fiber-reinforced polymer.

It will be appreciated that the radome structure 301 and all components described in reference to the radome structure 301 as shown in FIG. 3b may have any of the characteristics described herein with reference to corresponding components in FIG. 1a, FIG. 1b, FIG. 2a, FIG. 2b, and FIG. 3a. In particular, the characteristics of the radome structure 301, the structural component 320, the first fiber-reinforced dielectric layer 321, the first low-dielectric constant layer 322, the second fiber-reinforced dielectric layer 323, the second low-dielectric constant layer 324, the third fiber-reinforced dielectric layer 325, the inner tuning layer component 310, the first inner tuning layer 311, the second inner tuning layer 312, the first outer tuning layer component 330, and the first outer tuning layer 331 shown in FIG. 3b may have any of the corresponding characteristics described herein in reference to the radome structure 300 (200) (201) (100) (101), the structural component 320 (220) (120), the first fiber-reinforced dielectric layer 321 (221) (121), the first low-dielectric constant layer 322 (222) (122), the second fiber-reinforced dielectric layer 323 (223) (123), the second low-dielectric constant layer 324, the third fiber-reinforced dielectric layer 325, the inner tuning layer component 310 (210) (110), the first inner tuning layer 211 (111), the second inner tuning layer 212 (112), the first outer tuning layer component 230 (130), and the first outer tuning layer 231 (131) shown in FIG. 1a, FIG. 1b, FIG. 2a, and/or FIG. 2b, respectively.

Figure 4A:
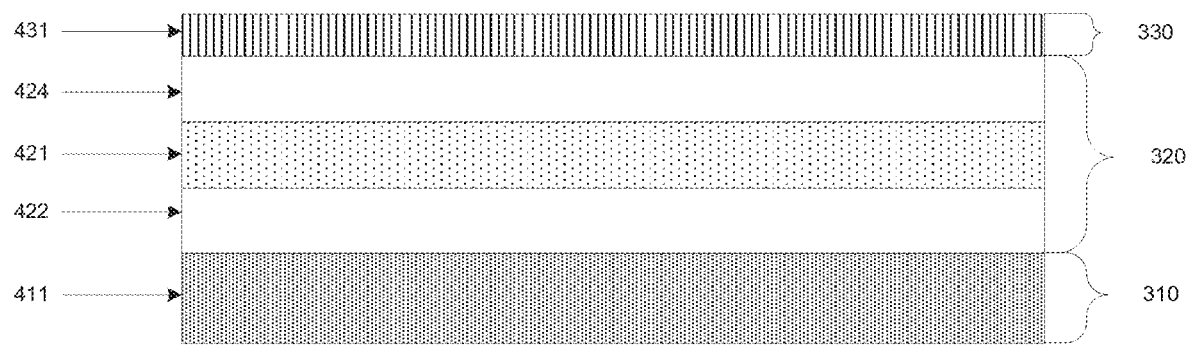
FIGS. 4a & 4b include illustrations of a radome structure according to embodiments described herein.

For purposes of further illustration, FIG. 4a includes an illustration of a radome structure 400 according to yet another alternative embodiment described herein. According to certain embodiments, and as shown in FIG. 4a, a radome structure 400 may include a structural component 420, an inner tuning layer component 410 underlying the structural component 420, and an outer tuning layer component 430 overlying the structural component 420. According to certain embodiments, and as also shown in FIG. 4a, the structural component 420 may include a first low-dielectric constant layer 422, a first fiber-reinforced dielectric layer 421 overlying the first low-dielectric constant layer 422, and a second low-dielectric layer 424 overlying the first fiber-reinforced dielectric layer 421. The first fiber-reinforced dielectric layer 421 may include a first fiber-reinforced polymer. According to still other embodiments, and as further shown in FIG. 4a, the inner tuning layer component 410 may include a first inner tuning layer 411 that may include a second fiber-reinforced polymer. According to yet other embodiments, and as further shown in FIG. 4a, the outer tuning layer component 430 may include a first outer tuning layer 431 that may include a third fiber-reinforced polymer.

It will be appreciated that the radome structure 400 and all components described in reference to the radome structure 400 as shown in FIG. 4a may have any of the characteristics described herein with reference to corresponding components in FIG. 1a, FIG. 1b, FIG. 2a, FIG. 2b, FIG. 3a and FIG. 3b. In particular, the characteristics of the radome structure 400, the structural component 420, the first low-dielectric constant layer 422, the first fiber-reinforced dielectric layer 421, the second low-dielectric constant layer 424, the inner tuning layer component 410, the first inner tuning layer 411, the second inner tuning layer 412, the first outer tuning layer component 430 shown in FIG. 4a may have any of the corresponding characteristics described herein in reference to the radome structure 300 (301) (200) (201) (100) (101), the structural component 320 (220) (120), the first low-dielectric constant layer 322 (222) (122), the first fiber-reinforced dielectric layer 321 (221) (121), the second low-dielectric constant layer 324, the inner tuning layer component 310 (210) (110), the first inner tuning layer 311 (211) (111), the first outer tuning layer component 330 (230) (130), and the first outer tuning layer 331 (231) (131) shown in FIG. 1a, FIG. 1b, FIG. 2a, FIG. 2b, FIG. 3a, and FIG. 3b respectively.

Figure 4B:
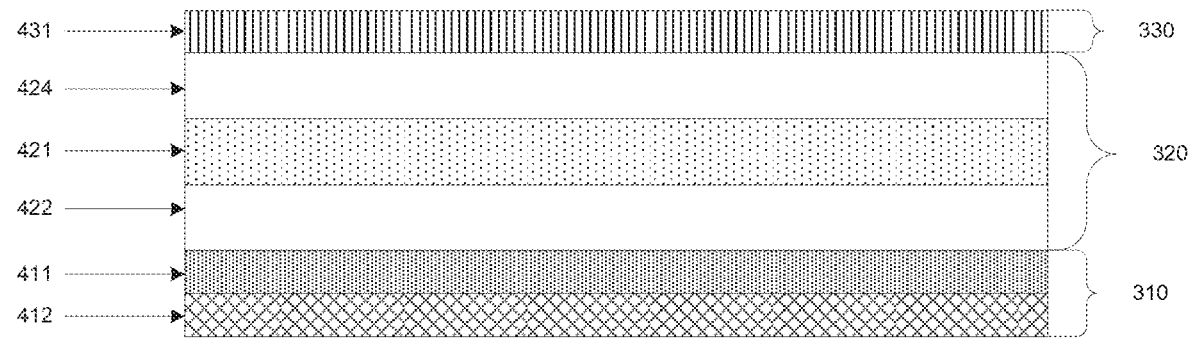

For purposes of further illustration, FIG. 4b includes an illustration of a radome structure 401 according to yet another alternative embodiment described herein. According to certain embodiments, and as shown in FIG. 4b, a radome structure 400 may include a structural component 420, an inner tuning layer component 410 underlying the structural component 420, and an outer tuning layer component 430 overlying the structural component 420. According to certain embodiments, and as also shown in FIG. 4a, the structural component 420 may include a first low-dielectric constant layer 422, a first fiber-reinforced dielectric layer 421 overlying the first low-dielectric constant layer 422, and a second low-dielectric layer 424 overlying the first fiber-reinforced dielectric layer 421. The first fiber-reinforced dielectric layer 421 may include a first fiber-reinforced polymer. According to still other embodiments, and as further shown in FIG. 4a, the inner tuning layer component 410 may include a first inner tuning layer 411 that may include a second fiber-reinforced polymer. According to yet other embodiments, and as further shown in FIG. 4a, the outer tuning layer component 430 may include a first outer tuning layer 431 that may include a third fiber-reinforced polymer.

It will be appreciated that the radome structure 400 and all components described in reference to the radome structure 400 as shown in FIG. 4a may have any of the characteristics described herein with reference to corresponding components in FIG. 1a, FIG. 1b, FIG. 2a, FIG. 2b, FIG. 3a and FIG. 3b. In particular, the characteristics of the radome structure 400, the structural component 420, the first low-dielectric constant layer 422, the first fiber-reinforced dielectric layer 421, the second low-dielectric constant layer 424, the inner tuning layer component 410, the first inner tuning layer 411, the second inner tuning layer 412, the first outer tuning layer component 430 shown in FIG. 4a may have any of the corresponding characteristics described herein in reference to the radome structure 300 (301) (200) (201) (100) (101), the structural component 320 (220) (120), the first low-dielectric constant layer 322 (222) (122), the first fiber-reinforced dielectric layer 321 (221) (121), the second low-dielectric constant layer 324, the inner tuning layer component 310 (210) (110), the first inner tuning layer 311 (211) (111), the first outer tuning layer component 330 (230) (130), and the first outer tuning layer 331 (231) (131) shown in FIG. 1a, FIG. 1b, FIG. 2a, FIG. 2b, FIG. 3a, and FIG. 3b respectively.

Figure 5A:
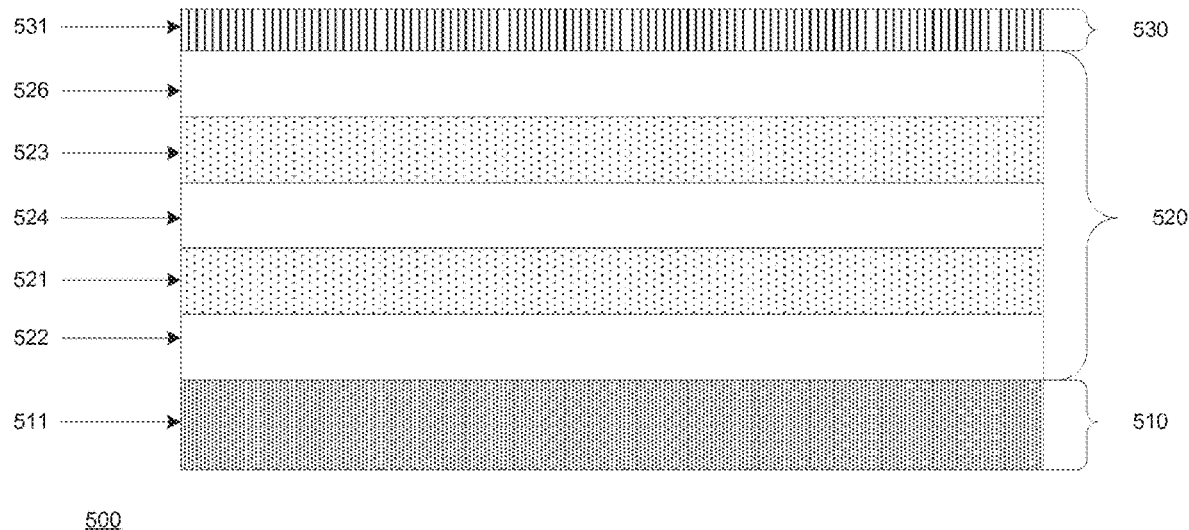
FIGS. 5a & 5b include illustrations of a radome structure according to embodiments described herein.

For purposes of further illustration, FIG. 5a includes an illustration of a radome structure 500 according to an alternative embodiment described herein. According to certain embodiments, and as shown in FIG. 5a, a radome structure 500 may include a structural component 520, an inner tuning layer component 510 underlying the structural component 520, and an outer tuning layer component 530 overlying the structural component 520. According to certain embodiments, and as also shown in FIG. 5a, the structural component 520 may include a first low-dielectric constant layer 522, a first fiber-reinforced dielectric layer 521 overlying the first low-dielectric constant layer 522, and a second low-dielectric layer 524 overlying the first fiber-reinforced dielectric layer 521, a second fiber-reinforced dielectric layer 523 overlying the second low-dielectric layer 524, and a third low-dielectric layer 526 overlying the second fiber-reinforced dielectric layer 524. The first fiber-reinforced dielectric layer 521 may include a first fiber-reinforced polymer, and the second fiber-reinforced dielectric layer 523 may include a fourth fiber-reinforced polymer. According to still other embodiments, and as further shown in FIG. 5a, the inner tuning layer component 510 may include a first inner tuning layer 511 that may include a second fiber-reinforced polymer. According to yet other embodiments, and as further shown in FIG. 5a, the outer tuning layer component 530 may include a first outer tuning layer 531 that may include a third fiber-reinforced polymer.

It will be appreciated that the radome structure 500 and all components described in reference to the radome structure 500 as shown in FIG. 5a may have any of the characteristics described herein with reference to corresponding components in FIG. 1a, FIG. 1b, FIG. 2a, FIG. 2b, FIG. 3a, FIG. 3b, FIG. 4a and FIG. 4b. In particular, the characteristics of the radome structure 500, the structural component 520, the first low-dielectric constant layer 522, the first fiber-reinforced dielectric layer 521, the second low-dielectric constant layer 524, the second fiber-reinforced dielectric layer 523, the inner tuning layer component 510, the first inner tuning layer 511, the second inner tuning layer 512, the first outer tuning layer component 530 shown in FIG. 5a may have any of the corresponding characteristics described herein in reference to the radome structure 400 (400) (300) (301) (200) (201) (100) (101), the structural component 420 (320) (220) (120), the first low-dielectric constant layer 422 (322) (222) (122), the first fiber-reinforced dielectric layer 421 (321) (221) (121), the second low-dielectric constant layer 424 (324), the inner tuning layer component 410 (310) (210) (110), the first inner tuning layer 411 (311) (211) (111), the first outer tuning layer component 430 (330) (230) (130), and the first outer tuning layer 431 (331) (231) (131) shown in FIG. 1a, FIG. 1b, FIG. 2a, FIG. 2b, FIG. 3a, FIG. 3b, FIG. 4a and FIG. 4b, respectively.

Referring now to the third low-dielectric constant layer 526 of the structural component 520, according to certain embodiments, the third low-dielectric constant layer 526 may include a low dielectric constant material.

According to particular embodiments, the low dielectric material of the third low-dielectric constant layer 526 may have a particular dielectric constant. For example, the dielectric constant of the low dielectric material may be at least about 1.1, such as, at least about 1.2 or at least about 1.3 or at least about 1.4 or at least about 1.5 or at least about 1.6 or at least about 1.7 or at least about 1.8 or at least about 1.9 or at least about 2.0 or at least about 2.1 or at least about 2.2 or at least about 2.3 or even at least about 2.4. According to yet other embodiment, the dielectric constant of the low dielectric material may be not greater than about 5.0, such as, not greater than about 4.9 or not greater than about 4.8 or not greater than about 4.7 or not greater than about 4.6 or not greater than about 4.5 or not greater than about 4.4 or not greater than about 4.3 or not greater than about 4.2 or not greater than about 4.1 or not greater than about 4.0 or not greater than about 3.9 or not greater than about 3.8 or not greater than about 3.7 or not greater than about 3.6 or not greater than about 3.5 or not greater than about 3.4 or not greater than about 3.3 or not greater than about 3.2 or not greater than about 3.1 or not greater than about 3.0 or not greater than about 2.9 or not greater than about 2.8 or not greater than about 2.7 or even not greater than about 2.6. It will be appreciated that the dielectric constant of the low dielectric material may be within a range between any of the values noted above. It will be further appreciated that the dielectric constant of the low dielectric material may be any value between any of the minimum and maximum values noted above.

According to particular embodiments, the third low-dielectric constant layer 526 may have a particular dielectric constant. For example, the dielectric constant of the third low-dielectric constant layer 526 may be at least about 1.1, such as, at least about 1.2 or at least about 1.3 or at least about 1.4 or at least about 1.5 or at least about 1.6 or at least about 1.7 or at least about 1.8 or at least about 1.9 or at least about 2.0 or at least about 2.1 or at least about 2.2 or at least about 2.3 or even at least about 2.4. According to yet other embodiment, the dielectric constant of the third low-dielectric constant layer 526 may be not greater than about 5.0, such as, not greater than about 4.9 or not greater than about 4.8 or not greater than about 4.7 or not greater than about 4.6 or not greater than about 4.5 or not greater than about 4.4 or not greater than about 4.3 or not greater than about 4.2 or not greater than about 4.1 or not greater than about 4.0 or not greater than about 3.9 or not greater than about 3.8 or not greater than about 3.7 or not greater than about 3.6 or not greater than about 3.5 or not greater than about 3.4 or not greater than about 3.3 or not greater than about 3.2 or not greater than about 3.1 or not greater than about 3.0 or not greater than about 2.9 or not greater than about 2.8 or not greater than about 2.7 or even not greater than about 2.6. It will be appreciated that the dielectric constant of the third low-dielectric constant layer 526 may be within a range between any of the values noted above. It will be further appreciated that the dielectric constant of the third low-dielectric constant layer 526 may be any value between any of the minimum and maximum values noted above.

According to particular embodiments, the low dielectric material of the third low-dielectric constant layer 526 may include a polymer foam. According to yet other embodiments, the low dielectric material of the third low-dielectric constant layer 526 may include a syntactic foam. According to still other embodiments, the low dielectric material of the third low-dielectric constant layer 526 may include a HMPP-reinforced polymer. According to particular embodiments, the low dielectric material of the third low-dielecconstant layer 526 may consist essentially of a polymer foam. According to yet other embodiments, the low dielectric material of the third low-dielectric constant layer 526 may consist essentially of a syntactic foam. According to still other embodiments, the low dielectric material of the third low-dielectric constant layer 526 may consist essentially of a HMPP-reinforced polymer.

According to particular embodiments, the third low-dielectric constant layer 526 may include a polymer foam. According to yet other embodiments, the third low-dielectric constant layer 526 may include a syntactic foam. According to still other embodiments, the third low-dielectric constant layer 526 may include a HMPP-reinforced polymer. According to particular embodiments, the third low-dielectric constant layer 526 may consist essentially of a polymer foam. According to yet other embodiments, the third low-dielectric constant layer 526 may consist essentially of a syntactic foam. According to still other embodiments, the third low-dielectric constant layer 526 may consist essentially of a HMPP-reinforced polymer.

Figure 5B:
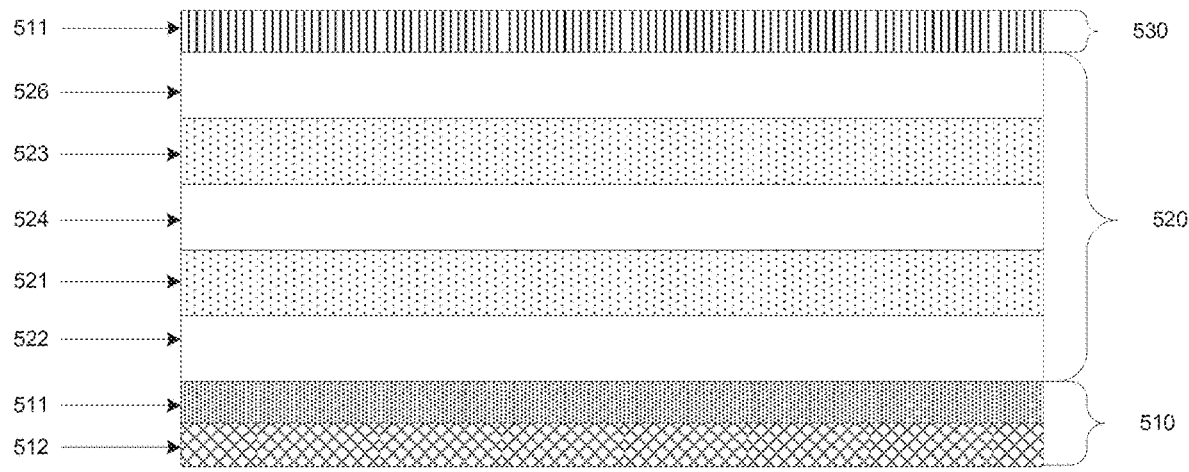

For purposes of further illustration, FIG. 5b includes an illustration of a radome structure 501 according to yet another alternative embodiment described herein. According to certain embodiments, and as shown in FIG. 5b, a radome structure 501 may include a structural component 520, an inner tuning layer component 510 underlying the structural component 520, and an outer tuning layer component 530 overlying the structural component 520. According to certain embodiments, and as also shown in FIG. 5b, the structural component 520 may include a first low-dielectric constant layer 522, a first fiber-reinforced dielectric layer 521 overlying the first low-dielectric constant layer 522, and a second low-dielectric layer 524 overlying the first fiber-reinforced dielectric layer 521, a second fiber-reinforced dielectric layer 523 overlying the second low-dielectric layer 524, and a third low-dielectric layer 526 overlying the second fiber-reinforced dielectric layer 524. According to still other embodiments, and as further shown in FIG. 5b, the inner tuning layer component 510 may include a first inner tuning layer 511 and a second inner tuning layer 512. The first inner tuning layer 511 may include a second fiber-reinforced polymer and the second inner tuning layer 512 may include a polymer foam layer. According to yet other embodiments, and as further shown in FIG. 5b, the outer tuning layer component 530 may include a first outer tuning layer 531 that may include a third fiber-reinforced polymer.

It will be appreciated that the radome structure 501 and all components described in reference to the radome structure 501 as shown in FIG. 5b may have any of the characteristics described herein with reference to corresponding components in FIG. 1a, FIG. 1b, FIG. 2a, FIG. 2b, FIG. 3a, FIG. 3b, FIG. 4a, FIG. 4b and FIG. 5a. In particular, the characteristics of the radome structure 500, the structural component 520, the first low-dielectric constant layer 522, the first fiber-reinforced dielectric layer 521, the second low-dielectric constant layer 524, the second fiber-reinforced dielectric layer 523, the inner tuning layer component 510, the first inner tuning layer 511, the second inner tuning layer 512, the first outer tuning layer component 530 shown in FIG. 5a may have any of the corresponding characteristics described herein in reference to the radome structure 500 (400) (300) (301) (200) (201) (100) (101), the structural component 520 (420) (320) (220) (120), the first low-dielectric constant layer 522 (422) (322) (122), the first fiber-reinforced dielectric layer 521 (421) (321) (221) (121), the second low-dielectric constant layer 524 (424) (324), the inner tuning layer component 410 (310) (210) (110), the first inner tuning layer 511 (411) (311) (211) (111), the first outer tuning layer component 530 (430) (330) (230) (130), and the first outer tuning layer 531 (431) (331) (231) (131) shown in FIG. 1a, FIG. 1b, FIG. 2a, FIG. 2b, FIG. 3a, FIG. 3b, FIG. 4a, FIG. 4b, and FIG. 5a respectively.

It will be appreciated that according to other particular embodiments, any radome structure described herein (i.e., radome structures 100, 101, 200, 201, 300, 301, 400, 401, 500 or 501) may alternatively include an intermediate tuning layer located between any two of the fiber-reinforced layers. According to still other embodiments, any radome structure described herein (i.e., radome structures 100, 101, 200, 201, 300, 301, 400, 401, 500 or 501) may alternatively include an intermediate tuning layer located between each of the fiber-reinforced layers in the radome structure.

According to certain embodiments, an intermediate tuning layer in a radome structure may include a polymer resin material. According to still other embodiments, an intermediate tuning layer in the radome structure may include a syntactic foam.

According to yet other embodiments, an intermediate tuning layer in the radome structure may have a particular density. For example, an intermediate tuning layer in the radome structure may have a density of at least about 300 kg/m$^3$, such as, at least about 310 kg/m$^3$ or at least about 320 kg/m$^3$ or at least about 330 kg/m$^3$ or at least about 340 kg/m$^3$ or at least about 350 kg/m$^3$ or at least about 360 kg/m$^3$ or at least about 370 kg/m$^3$ or at least about 380 kg/m$^3$ or at least about 390 kg/m$^3$ or at least about 400 kg/m$^3$ or at least about 410 kg/m$^3$ or at least about 420 kg/m$^3$ or at least about 430 kg/m$^3$ or at least about 440 kg/m$^3$ or at least about 450 kg/m$^3$ or at least about 460 kg/m$^3$ or at least about 470 kg/m$^3$ or at least about 480 kg/m$^3$ or at least about 490 kg/m$^3$ or even at least about 500 kg/m$^3$. According to still other embodiments, an intermediate tuning layer in the radome structure may have a density of not greater than about 1000 kg/m$^3$, such as, not greater than about 990 kg/m$^3$ or not greater than about 980 kg/m$^3$ or not greater than about 970 kg/m$^3$ or not greater than about 960 kg/m$^3$ or not greater than about 950 kg/m$^3$ or not greater than about 940 kg/m$^3$ or not greater than about 930 kg/m$^3$ or not greater than about 920 kg/m$^3$ or not greater than about 910 kg/m$^3$ or not greater than about 900 kg/m$^3$ or not greater than about 890 kg/m$^3$ or not greater than about 880 kg/m$^3$ or not greater than about 870 kg/m$^3$ or not greater than about 860 kg/m$^3$ or not greater than about 850 kg/m$^3$ or not greater than about 840 kg/m$^3$ or not greater than about 830 kg/m$^3$ or not greater than about 820 kg/m$^3$ or not greater than about 810 kg/m$^3$ or even not greater than about 800 kg/m$^3$. It will be appreciated that the density of an intermediate tuning layer in the radome structure may be within a range between any of the minimum and maximum values noted above. It will be further appreciated that an intermediate tuning layer in the radome structure may be any value between any of the minimum and maximum values noted above.

According to yet other embodiments, an intermediate tuning layer in the radome structure may have a particular dielectric constant. For example, an intermediate tuning layer in the radome structure may have a dielectric constant of at least about 1.00, such as, at least about 1.05 or at least about 1.10 or at least about 1.15 or at least about 1.20 or at least about 1.25 or at least about 1.30 or at least about 1.35 or at least about 1.40 or at least about 1.45 or at least about 1.50 or at least about 1.55 or at least about 1.6 or at least about 1.65 or at least about 1.7 or at least about 1.75 or at least about 1.8 or at least about 1.85 or at least about 1.9 or at least about 1.95 or at least about 2.0 or at least about 2.05 or at least about 2.1 or at least about 2.15 or even at least about 2.2. According to yet other embodiments, an intermediate tuning layer in the radome structure may have a dielectric constant of not greater than about 3.0 or not greater than about 2.95 or not greater than about 2.9 or not greater than about 2.85 or not greater than about 2.80 or not greater than about 2.75 or not greater than about 2.7 or not greater than about 2.65 or not greater than about 2.6 or not greater than about 2.55 or even not greater than about 2.5. It will be appreciated that the dielectric constant of an intermediate tuning layer in the radome structure may be within a range between any of the minimum and maximum values noted above. It will be further appreciated that the dielectric constant of an intermediate tuning layer in the radome structure may be any value between any of the minimum and maximum values noted above.

According to yet other embodiments, an intermediate tuning layer in the radome structure may have a particular thickness. For example, an intermediate tuning layer in the radome structure may have a thickness of at least about 0.1 mm, such as, at least about 0.3 mm or at least about 0.5 mm or at least about 0.7 mm or at least about 1.0 mm or at least about 1.3 mm or at least about 1.5 mm or at least about 1.7 mm or at least about 2.0 mm or at least about 2.5 mm or at least about 3.0 mm. According to yet other embodiments, an intermediate tuning layer in the radome structure may have a thickness of not greater than about 6.5 mm, such as, not greater than about 6.25 or not greater than about 6.0 mm or not greater than about 5.75 mm or not greater than about 5.5 mm or not greater than about 5.25 mm or not greater than about 5.0 mm or not greater than about 4.75 mm or not greater than about 4.5 mm or not greater than about 4.25 mm or not greater than about 4.0 mm or not greater than about 3.75 mm or even not greater than about 3.5 mm. It will be appreciated that the thickness of an intermediate tuning layer in the radome structure may be within a range between any of the minimum and maximum values noted above. It will be further appreciated that an intermediate tuning layer in the radome structure may be any value between any of the minimum and maximum values noted above.

It will be appreciated that a radome having a structure formed according to embodiments described herein was simulated and shown to improve performance of the radome by as much as 0.5 dB or greater in co-polarization within frequency ranges across the K- and Ka-bands compared with comparative radome structures. Additionally, a radome having a structure formed according to embodiments described herein was simulated and shown to improve performance of the radome by as much as 10 dB or greater in cross-polarization within frequency ranges across the K- and Ka-bands compared with comparative radome structures.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A radome structure comprising: a structural component, wherein the structural component comprises a first fiber-reinforced dielectric layer comprising a first fiber-reinforced polymer; an inner tuning layer component underlying the structural component, wherein the inner tuning layer component comprises a first inner tuning layer comprising a second fiber-reinforced polymer; and an outer tuning layer component overlying the structural component, wherein the outer tuning layer component comprises a first outer tuning layer comprising a third fiber-reinforced polymer.

Embodiment 2. The radome structure of embodiment 1, wherein the first fiber-reinforced polymer comprises a first polymer component and a first fiber component.

Embodiment 3. The radome structure of embodiment 2, wherein the first polymer component comprises an epoxy, a cyanate ester resin, or combinations thereof.

Embodiment 4. The radome structure of any one of embodiments 2 and 3, wherein the first fiber component comprises a low-dielectric constant quartz fabric, a high-modulus polypropylene (HMPP) fabric, an electrical-grade glass (E-glass) fabric, a structural-grade glass (S-glass) fabric, a basalt fabric, or unidirectional ribbons of a low-dielectric constant quartz fabric, unidirectional ribbons of an electrical-grade glass (E-glass) fabric, unidirectional ribbons of a structural-grade glass (S-glass) fabric, unidirectional ribbons of a basalt fabric, combinations thereof, or and multi-material hybrid weaves thereof.

Embodiment 5. The radome structure of embodiment 1, wherein the second fiber-reinforced polymer comprises a second polymer component and a second fiber component.

Embodiment 6. The radome structure of embodiment 5, wherein the second polymer component comprises an epoxy, a cyanate ester resin, or combinations thereof.

Embodiment 7. The radome structure of any one of embodiments 5 and 6, wherein the second fiber component comprises a high-modulus polypropylene (HMPP) fabric, a unidirectional ribbon of HMPP, a hybrid weave of HMPP with at least one of E-glass, S-glass, basalt, or quartz fibers, or combinations thereof.

Embodiment 8. The radome structure of embodiment 1, wherein the third fiber-reinforced polymer comprises a third polymer component and a third fiber component.

Embodiment 9. The radome structure of embodiment 8, wherein the third polymer component comprises an epoxy, a cyanate ester resin, or combinations thereof.

Embodiment 10. The radome structure of any one of embodiments 8 and 9, wherein the third fiber component comprises a high-modulus polypropylene (HMPP) fabric, a unidirectional ribbon of HMPP, a hybrid weave of HMPP with at least one of E-glass, S-glass, basalt, or quartz fibers, or combinations thereof.

Embodiment 11. The radome structure of embodiment 1, wherein the inner tuning layer component has a thickness of at least about 0.5 mm.

Embodiment 12. The radome structure of embodiment 1, wherein the inner tuning layer component has a thickness of not greater than about 4.0 mm.

Embodiment 13. The radome structure of embodiment 1, wherein the first inner tuning layer has a thickness of at least about 0.5 mm.

Embodiment 14. The radome structure of embodiment 1, wherein the wherein the first inner tuning layer has a thickness of not greater than about 4.0 mm.

Embodiment 15. The radome structure of any one of embodiments 1, 2, 3, 4, 5, 6, 7, 8, 9, and 10, wherein the inner tuning layer component further comprises a second inner tuning layer underlying the first inner tuning layer, wherein the second inner tuning layer comprises a polymer foam layer.

Embodiment 16. The radome structure of embodiment 15, wherein the second inner tuning layer has a thickness of at least about 0.5 mm.

Embodiment 17. The radome structure of embodiment 1, wherein the wherein the second inner tuning layer has a thickness of not greater than about 4.0 mm.

Embodiment 18. The radome structure of embodiment 15, wherein the polymer foam layer comprises a dielectric constant of at least about 1.05.

Embodiment 19. The radome structure of any one of embodiments 15 and 18, wherein the polymer foam layer comprises a dielectric constant of not greater than about 1.4.

Embodiment 20. The radome structure of embodiment 15, wherein the polymer foam layer comprises a density of not at least about 2 lbs per cubic foot.

Embodiment 21. The radome structure of any one of embodiments 15 and 18, wherein the polymer foam layer comprises a density of not greater than about 10 lbs per cubic foot.

Embodiment 22. The radome structure of embodiment 15, wherein the polymer foam layer comprises a thickness of at least about 0.5 mm.

Embodiment 23. The radome structure of any one of embodiments 15 and 18, wherein the polymer foam layer comprises a thickness of no greater than about 4.0 mm.

Embodiment 24. The radome structure of embodiment 1, wherein the structural component further comprises: a first low-dielectric constant layer overlying the first fiber-reinforced dielectric layer; and a second fiber-reinforced dielectric layer overlying the first low-dielectric layer, wherein the second fiber-reinforced dielectric layer comprises a fourth fiber-reinforced polymer.

Embodiment 25. The radome structure of embodiment 24, wherein the first fiber-reinforced dielectric layer comprises a high dielectric constant material.

Embodiment 26. The radome structure of embodiment 25, wherein the high dielectric constant material has a dielectric constant of at least about 2.5.

Embodiment 27. The radome structure of embodiment 25, wherein the high dielectric constant material has a dielectric constant of not greater than about 8.0.

Embodiment 28. The radome structure of embodiment 25, wherein the first fiber-reinforced dielectric layer has a dielectric constant of at least about 2.5.

Embodiment 29. The radome structure of embodiment 25, wherein the first fiber-reinforced dielectric layer has a dielectric constant of not greater than about 8.0.

Embodiment 30. The radome structure of embodiment 25, wherein the first fiber-reinforced polymer comprises a first polymer component and a first fiber component.

Embodiment 31. The radome structure of embodiment 30, wherein the first polymer component comprises an epoxy, a cyanate ester resin, or combinations thereof.

Embodiment 32. The radome structure of embodiment 30, wherein the first fiber component comprises quartz, E-glass, S-glass, HMPP, or basalt fibers, hybrid weaves of one or more materials, or combinations thereof.

Embodiment 33. The radome structure of embodiment 24, wherein the first low-dielectric constant layer comprises a low-dielectric constant material.

Embodiment 34. The radome structure of embodiment 33, wherein the low-dielectric constant material of the first low-dielectric constant layer has a dielectric constant of at least about 1.1.

Embodiment 35. The radome structure of embodiment 33, wherein the low-dielectric constant material of the first low-dielectric constant layer has a dielectric constant of not greater than about 5.0.

Embodiment 36. The radome structure of embodiment 33, wherein the first low-dielectric constant layer has a dielectric constant of at least about 1.1.

Embodiment 37. The radome structure of embodiment 33, wherein the first low-dielectric constant layer has a dielectric constant of not greater than about 5.0.

Embodiment 38. The radome structure of embodiment 24, wherein the first low-dielectric constant layer comprises a polymer foam, a syntactic foam, or a HMPP-reinforced polymer.

Embodiment 39. The radome structure of embodiment 24, wherein the second fiber-reinforced dielectric layer comprises a high dielectric constant material.

Embodiment 40. The radome structure of embodiment 39, wherein the high dielectric constant material has a dielectric constant of at least about 2.5.

Embodiment 41. The radome structure of embodiment 39, wherein the high dielectric constant material has a dielectric constant of not greater than about 8.0.

Embodiment 42. The radome structure of embodiment 39, wherein the second fiber-reinforced dielectric layer has a dielectric constant of at least about 2.5.

Embodiment 43. The radome structure of embodiment 39, wherein the second fiber-reinforced dielectric layer has a dielectric constant of not greater than about 8.0.

Embodiment 44. The radome structure of embodiment 25, wherein the fourth fiber-reinforced polymer comprises a fourth polymer component and a fourth fiber component.

Embodiment 45. The radome structure of embodiment 44, wherein the fourth polymer component comprises an epoxy, a cyanate ester resin, or combinations thereof.

Embodiment 46. The radome structure of embodiment 44, wherein the fourth fiber component comprises quartz, E-glass, S-glass, HMPP, or basalt fibers, hybrid weaves of one or more materials, or combinations thereof.

Embodiment 47. The radome structure of embodiment 24, wherein the laminate component further comprises: a second low-dielectric layer overlying the second fiber-reinforced dielectric layer; and a third fiber-reinforced dielectric layer overlying the second low-dielectric layer, wherein the third fiber-reinforced dielectric layer comprises a fifth fiber-reinforced polymer.

Embodiment 48. The radome structure of embodiment 47, wherein the second low-dielectric constant layer comprises a low-dielectric constant material.

Embodiment 49. The radome structure of embodiment 48, wherein the low-dielectric constant material of the second low-dielectric constant layer has a dielectric constant of at least about 1.1.

Embodiment 50. The radome structure of embodiment 48, wherein the low-dielectric constant material of the second low-dielectric constant layer has a dielectric constant of not greater than about 5.0.

Embodiment 51. The radome structure of embodiment 48, wherein the second low-dielectric constant layer has a dielectric constant of at least about 1.1.

Embodiment 52. The radome structure of embodiment 48, wherein the second low-dielectric constant layer has a dielectric constant of not greater than about 3.5.

Embodiment 53. The radome structure of embodiment 47, wherein the second low-dielectric constant layer comprises a polymer foam, a syntactic foam, or a HMPP-reinforced polymer.

Embodiment 54. The radome structure of embodiment 47, wherein the third fiber-reinforced dielectric layer comprises a high dielectric constant material.

Embodiment 55. The radome structure of embodiment 54, wherein the high dielectric constant material has a dielectric constant of at least about 2.5.

Embodiment 56. The radome structure of embodiment 54, wherein the high dielectric constant material has a dielectric constant of not greater than about 8.0.

Embodiment 57. The radome structure of embodiment 54, wherein the third fiber-reinforced dielectric layer has a dielectric constant of at least about 2.5.

Embodiment 58. The radome structure of embodiment 54, wherein the third fiber-reinforced dielectric layer has a dielectric constant of not greater than about 8.0.

Embodiment 59. The radome structure of embodiment 47, wherein the fifth fiber-reinforced polymer comprises a fifth polymer component and a fifth fiber component.

Embodiment 60. The radome structure of embodiment 59, wherein the fifth polymer component comprises an epoxy, a cyanate ester resin, or combinations thereof.

Embodiment 61. The radome structure of embodiment 59, wherein the fourth fiber component comprises quartz, E-glass, S-glass, HMPP, or basalt fibers, hybrid weaves of one or more materials, or combinations thereof.

Embodiment 62. The radome structure of embodiment 1, wherein the structural component further comprises: a first low-dielectric layer underlying the first fiber-reinforced dielectric layer; and a second low-dielectric layer overlying the first fiber-reinforced dielectric layer.

Embodiment 63. The radome structure of embodiment 62, wherein the first fiber-reinforced dielectric layer comprises a high dielectric constant material.

Embodiment 64. The radome structure of embodiment 63, wherein the high dielectric constant material has a dielectric constant of at least about 2.5.

Embodiment 65. The radome structure of embodiment 63, wherein the high dielectric constant material has a dielectric constant of not greater than about 8.0.

Embodiment 66. The radome structure of embodiment 63, wherein the first fiber-reinforced dielectric layer has a dielectric constant of at least about 2.5.

Embodiment 67. The radome structure of embodiment 63, wherein the first fiber-reinforced dielectric layer has a dielectric constant of not greater than about 8.0.

Embodiment 68. The radome structure of embodiment 63, wherein the first fiber-reinforced polymer comprises a first polymer component and a first fiber component.

Embodiment 69. The radome structure of embodiment 63, wherein the first polymer component comprises an epoxy, a cyanate ester resin, or combinations thereof.

Embodiment 70. The radome structure of embodiment 63, wherein the first fiber component comprises quartz, E-glass, S-glass, HMPP, or basalt fibers, hybrid weaves of one or more materials, or combinations thereof.

Embodiment 71. The radome structure of embodiment 62, wherein the first low-dielectric constant layer comprises a low-dielectric constant material.

Embodiment 72. The radome structure of embodiment 71, wherein the low-dielectric constant material of the first low-dielectric constant layer has a dielectric constant of at least about 1.1.

Embodiment 73. The radome structure of embodiment 71, wherein the low-dielectric constant material of the first low-dielectric constant layer has a dielectric constant of not greater than about 5.0.

Embodiment 74. The radome structure of embodiment 71, wherein the first low-dielectric constant layer has a dielectric constant of at least about 1.1.

Embodiment 75. The radome structure of embodiment 71, wherein the first low-dielectric constant layer has a dielectric constant of not greater than about 3.5.

Embodiment 76. The radome structure of embodiment 62, wherein the first low-dielectric constant layer comprises a polymer foam, a syntactic foam, or a HMPP-reinforced polymer.

Embodiment 77. The radome structure of embodiment 62, wherein the second low-dielectric constant layer comprises a low-dielectric constant material.

Embodiment 78. The radome structure of embodiment 77, wherein the low-dielectric constant material of the second low-dielectric constant layer has a dielectric constant of at least about 1.1.

Embodiment 79. The radome structure of embodiment 77, wherein the low-dielectric constant material of the second low-dielectric constant layer has a dielectric constant of not greater than about 5.0.

Embodiment 80. The radome structure of embodiment 77, wherein the second low-dielectric constant layer has a dielectric constant of at least about 1.1.

Embodiment 81. The radome structure of embodiment 77, wherein the second low-dielectric constant layer has a dielectric constant of not greater than about 3.5.

Embodiment 82. The radome structure of embodiment 62, wherein the second low-dielectric constant layer comprises a polymer foam, a syntactic foam, or a HMPP-reinforced polymer.

Embodiment 83. The radome structure of embodiment 62, wherein the structural component further comprises: a second fiber-reinforced dielectric layer overlying the second low-dielectric layer, wherein the second fiber-reinforced dielectric layer comprises a fourth fiber-reinforced polymer; and a third low-dielectric layer overlying the second fiber-reinforced dielectric layer.

Embodiment 84. The radome structure of embodiment 83, wherein the second fiber-reinforced dielectric layer comprises a high dielectric constant material.

Embodiment 85. The radome structure of embodiment 84, wherein the high dielectric constant material has a dielectric constant of at least about 2.5.

Embodiment 86. The radome structure of embodiment 84, wherein the high dielectric constant material has a dielectric constant of not greater than about 8.0.

Embodiment 87. The radome structure of embodiment 84, wherein the second fiber-reinforced dielectric layer has a dielectric constant of at least about 2.5.

Embodiment 88. The radome structure of embodiment 84, wherein the second fiber-reinforced dielectric layer has a dielectric constant of not greater than about 8.0.

Embodiment 89. The radome structure of embodiment 83, wherein the fourth fiber-reinforced polymer comprises a fourth polymer component and a fourth fiber component.

Embodiment 90. The radome structure of embodiment 89, wherein the fourth polymer component comprises an epoxy, a cyanate ester resin, or combinations thereof.

Embodiment 91. The radome structure of embodiment 89, wherein the fourth fiber component comprises quartz, E-glass, S-glass, HMPP, or basalt fibers, hybrid weaves of one or more materials, or combinations thereof.

Embodiment 92. The radome structure of embodiment 83, wherein the third low-dielectric constant layer comprises a low-dielectric constant material.

Embodiment 93. The radome structure of embodiment 92, wherein the low-dielectric constant material of the third low-dielectric constant layer has a dielectric constant of at least about 1.1.

Embodiment 94. The radome structure of embodiment 92, wherein the low-dielectric constant material of the third low-dielectric constant layer has a dielectric constant of not greater than about 5.0.

Embodiment 95. The radome structure of embodiment 92, wherein the third low-dielectric constant layer has a dielectric constant of at least about 1.1.

Embodiment 96. The radome structure of embodiment 92, wherein the third low-dielectric constant layer has a dielectric constant of not greater than about 3.5.

Embodiment 97. The radome structure of embodiment 83, wherein the third low-dielectric constant layer comprises a polymer foam, a syntactic foam, or a HMPP-reinforced polymer.

Embodiment 98. The radome structure of embodiment 1, wherein the radome structure further comprises a protection layer overlying the laminate component.

Embodiment 99. The radome structure of embodiment 1, wherein the radome structure further comprises a protection layer overlying the laminate component.

Embodiment 100. The radome structure of embodiment 1, wherein the radome structure comprises a thickness of at least about 5 mm.

Embodiment 101. The radome structure of embodiment 1, wherein the radome structure comprises a thickness of at least about 20 mm.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radome structure comprising:
    a structural component, wherein the structural component comprises a first fiber-reinforced dielectric layer comprising a first fiber-reinforced polymer, wherein the first fiber-reinforced polymer comprises a first polymer component and a first fiber component, wherein the first polymer component comprises an epoxy, a cyanate ester resin, or combinations thereof;
    an inner tuning layer component underlying the structural component, wherein the inner tuning layer component comprises a first inner tuning layer comprising a second fiber-reinforced polymer; and
    an outer tuning layer component overlying the structural component, wherein the outer tuning layer component comprises a first outer tuning layer comprising a third fiber-reinforced polymer.

2. The radome structure of claim 1, wherein the first fiber component comprises a low-dielectric constant quartz fabric, a high-modulus polypropylene (HMPP) fabric, an electrical-grade glass (E-glass) fabric, a structural-grade glass (S-glass) fabric, a basalt fabric, or unidirectional ribbons of a low-dielectric constant quartz fabric, unidirectional ribbons of an electrical-grade glass (E-glass) fabric, unidirectional ribbons of a structural-grade glass (S-glass) fabric, unidirectional ribbons of a basalt fabric, combinations thereof, or and multi-material hybrid weaves thereof.

3. The radome structure of claim 1, wherein the second fiber-reinforced polymer comprises a second polymer component and a second fiber component.

4. The radome structure of claim 3, wherein the second polymer component comprises an epoxy, a cyanate ester resin, or combinations thereof.

5. The radome structure of claim 4, wherein the second fiber component comprises a high-modulus polypropylene (HMPP) fabric, a unidirectional ribbon of HMPP, a hybrid weave of HMPP with at least one of E-glass, S-glass, basalt, or quartz fibers, or combinations thereof.

6. The radome structure of claim 1, wherein the third fiber-reinforced polymer comprises a third polymer component and a third fiber component.

7. The radome structure of claim 6, wherein the third polymer component comprises an epoxy, a cyanate ester resin, or combinations thereof.

8. The radome structure of claim 7, wherein the third fiber component comprises a high-modulus polypropylene (HMPP) fabric, a unidirectional ribbon of HMPP, a hybrid weave of HMPP with at least one of E-glass, S-glass, basalt, or quartz fibers, or combinations thereof.

9. The radome structure of claim 1, wherein the inner tuning layer component further comprises a second inner tuning layer underlying the first inner tuning layer, wherein the second inner tuning layer comprises a polymer foam layer.

10. The radome structure of claim 9, wherein the polymer foam layer comprises a dielectric constant of at least about 1.05.

11. The radome structure of claim 1, wherein the structural component further comprises:
    a first low-dielectric constant layer overlying the first fiber-reinforced dielectric layer; and
    a second fiber-reinforced dielectric layer overlying the first low-dielectric layer, wherein the second fiber-reinforced dielectric layer comprises a fourth fiber-reinforced polymer.

12. The radome structure of claim 11, wherein the first fiber-reinforced dielectric layer comprises a high dielectric constant material.

13. The radome structure of claim 11, wherein the structural component further comprises:
    a second low-dielectric constant layer overlying the second fiber-reinforced dielectric layer; and a third fiber-reinforced dielectric layer overlying the second low-dielectric constant layer, wherein the third fiber-reinforced dielectric layer comprises a fifth fiber-reinforced polymer.

14. The radome structure of claim 13, wherein the second low-dielectric constant layer comprises a low-dielectric constant material.

15. The radome structure of claim 13, wherein the low-dielectric constant material of the second low-dielectric constant layer has a dielectric constant of at least about 1.1.

16. The radome structure of claim 13, wherein the low-dielectric constant material of the second low-dielectric constant layer has a dielectric constant of not greater than about 5.0.

17. The radome structure of claim 13, wherein the second low-dielectric constant layer has a dielectric constant of at least about 1.1.

18. The radome structure of claim 13, wherein the second low-dielectric constant layer has a dielectric constant of not greater than about 3.5.

* * * * *